US007285204B2

(12) United States Patent
Iida et al.

(10) Patent No.: US 7,285,204 B2
(45) Date of Patent: Oct. 23, 2007

(54) APPARATUS FOR DETECTING DETERIORATION OF AIR-FUEL RATIO SENSOR

(75) Inventors: Hisashi Iida, Kariya (JP); Syujiro Morinaga, Takahama (JP); Yoshiyuki Okamoto, Kariya (JP)

(73) Assignee: Denso Corporation, Kariya (JP)

( * ) Notice: Subject to any disclaimer, the term of this patent is extended or adjusted under 35 U.S.C. 154(b) by 740 days.

(21) Appl. No.: 10/633,540

(22) Filed: Aug. 5, 2003

(65) Prior Publication Data

US 2004/0025856 A1 Feb. 12, 2004

(30) Foreign Application Priority Data

Aug. 6, 2002 (JP) ............................ 2002-228273

(51) Int. Cl.
*G01N 27/41* (2006.01)

(52) U.S. Cl. .................. 205/784.5; 205/785; 204/401; 204/424; 73/23.32

(58) Field of Classification Search ................ 204/401, 204/406, 424; 73/23.32; 205/784.5, 785
See application file for complete search history.

(56) References Cited

U.S. PATENT DOCUMENTS 5,811,661 A * 9/1998 Scheid et al. .............. 73/23.32
6,120,663 A * 9/2000 Kato et al. .................. 204/401
6,258,232 B1 * 7/2001 Hasegawa et al. .......... 204/424
6,935,155 B2 8/2005 Yasui et al.

FOREIGN PATENT DOCUMENTS

| | | |
|---|---|---|
| JP | 62-250351 | 10/1987 |
| JP | 3-87949 | 9/1991 |
| JP | 7-198672 | 1/1995 |

OTHER PUBLICATIONS

Certified translation of JP 07-198672, Aug. 1995.*
Japanese Office Action—Nov. 17, 2005.

* cited by examiner

*Primary Examiner*—Kaj K. Olsen
(74) *Attorney, Agent, or Firm*—Nixon & Vanderhye P.C.

(57) ABSTRACT

In detecting a deterioration of an air-fuel ratio sensor, a sensor output change speed integrated value is calculated when an element temperature of a solid electrolyte is stabilized at a low temperature. Successively, a sensor output change speed integrated value is calculated when the solid electrolyte element is stabilized at a high temperature. Finally, a deviation between the change speed integrated values is calculated. By comparing the deviation amount with a predetermined determinant, presence or absence of the deterioration is determined.

27 Claims, 19 Drawing Sheets

| QA (g/s) | 5 | 10 | 15 | 20 | 30 | 40 | 50 |
|---|---|---|---|---|---|---|---|
| λIR | 0.12 | 0.08 | 0.05 | 0.04 | 0.03 | 0.02 | 0.01 |
| λIL | 0.12 | 0.08 | 0.04 | 0.03 | 0.02 | 0.01 | 0.01 |

| QA (g/s) | 5 | 10 | 15 | 20 | 30 | 40 | 50 |
|---|---|---|---|---|---|---|---|
| λIR | 0.15 | 0.1 | 0.07 | 0.05 | 0.03 | 0.02 | 0.01 |
| λIL | 0.15 | 0.1 | 0.05 | 0.03 | 0.02 | 0.01 | 0.01 |

APPARATUS FOR DETECTING DETERIORATION OF AIR-FUEL RATIO SENSOR

CROSS REFERENCE TO RELATED APPLICATION

This application is based on and incorporates herein by reference Japanese Patent Application No. 2002-228273 filed on Aug. 6, 2002.

FIELD OF THE INVENTION

The present invention relates to an air-fuel ratio sensor, particularly to a deterioration detecting apparatus for an air-fuel ratio sensor for diagnosing a deterioration of a downstream air-fuel ratio sensor arranged downstream from a catalyst. More specifically, the present invention relates to an apparatus for detecting a deterioration of an air-fuel ratio sensor capable of detecting a deterioration of a downstream air-fuel ratio sensor at early time and accurately.

BACKGROUND OF THE INVENTION

Oxygen sensors are arranged respectively upstream and downstream from a catalyst interposed in an exhaust emission system of an engine. Further, in such a construction, an air-fuel ratio feedback correction coefficient is set based on an output value of the upstream oxygen ($O_2$) sensor arranged upstream from the catalyst and an air-fuel ratio is controlled such that an air-fuel ratio upstream from the catalyst becomes a target air-fuel ratio. Further, a dual $O_2$ air-fuel ratio control system is proposed to achieve proper formation of an air-fuel ratio by correcting the air-fuel ratio feedback correction coefficient based on an output value of the downstream oxygen sensor arranged downstream from the catalyst.

Meanwhile, in such a dual $O_2$ air-fuel ratio control system, when the respective oxygen sensors are deteriorated, response of the oxygen sensors is deteriorated. Therefore proper air-fuel ratio control is deteriorated.

Further, in the dual $O_2$ air-fuel ratio control system, a deterioration of the catalyst is diagnosed by comparing outputs of the two oxygen sensors provided upstream and downstream from the catalyst. Therefore, when the respective oxygen sensors are deteriorated, accuracy of diagnosing the deterioration of the catalyst using the oxygen sensors is also deteriorated. Therefore it is necessary to detect the deterioration of the air-fuel ratio sensors.

At this occasion, since the upstream oxygen sensor is arranged upstream from the catalyst, an oxygen concentration in exhaust emission gas emitted from the engine is directly detected. Therefore, when a variation of the air-fuel ratio is brought about, the upstream oxygen sensor immediately reacts with the variation of the air-fuel ratio. Hence, the deterioration of the upstream oxygen sensor can comparatively easily be detected by monitoring the output of the upstream air-fuel ratio sensor when the variation of the air-fuel ratio is brought about.

In contrast thereto, since the downstream oxygen sensor is provided downstream from the catalyst, the downstream oxygen sensor detects the air-fuel ratio in emission gas after passing the catalyst. Therefore, even when the variation of the air-fuel ratio is brought about, the variation of the air-fuel ratio is smoothed by oxygen adsorption and separation by oxidation and reduction reaction of the catalyst or a storage effect of the catalyst and the downstream oxygen sensor detects the smoothed air-fuel ratio. Further, the storage effect of the catalyst is changed by the deterioration. Therefore, it is difficult to detect the deterioration of the downstream oxygen sensor per se from a state of reaction of the downstream oxygen sensor with respect to the variation of the air-fuel ratio of the engine.

In order to resolve the problem, a method is proposed to detect the deterioration of the downstream air-fuel ratio sensor which is difficult to be effected by influence of the catalyst. For example, in JP-U-03-037949, an output of an oxygen sensor downstream from a catalyst is detected with respect to a variation in an air-fuel ratio upstream from the catalyst before the catalyst is activated. Further, in JP-A-62-250351, deterioration is detected when an air-fuel ratio is changed more than a catalyst storage function as at fuel cut-off.

However, according to the method of detecting the deterioration of the oxygen sensor before activating the catalyst as in JP-U-03-037949, a condition of detecting the deterioration is limited to that in cold starting. Similarly, according to the method of detecting the deterioration of the oxygen sensor at fuel cut-off as in JP-A-62-250351, a condition of detecting the deterioration is limited to that at fuel cut-off. Particularly, in the case of the vehicle of an automatic transmission, fuel cut-off is hardly operated in running a city area. Therefore a frequency of executing deterioration detection is reduced.

In this way, in either of the methods, the executing condition is significantly limited. Therefore the frequency of detection is reduced. Further, even when the executing condition is established, the executing condition is under a transient condition. Therefore it is difficult to ensure detection accuracy.

SUMMARY OF THE INVENTION

Therefore, it is an object of the invention to provide an apparatus for detecting a deterioration of an air-fuel ratio sensor which is difficult to be effected by an influence of a catalyst storage function and capable of ensuring a number of times of detection frequency.

In order to achieve this object, according to the invention, a deterioration of an air-fuel ratio sensor is detected by comparing outputs of the air-fuel ratio sensor when a temperature of a solid electrolyte element is adjusted at least to two different temperatures.

Abnormality of the air-fuel ratio sensor is detected by utilizing a characteristic that when the temperature of the solid electrolyte element of the air-fuel ratio sensor is changed, sensitivity with respect to an emission gas component is changed by a difference in the temperature of the solid electrolyte element, that is, the activity of an electrode portion thereof.

For example, in the case of a normal air-fuel ratio sensor, in accordance with a change of the temperature of the element, the sensitivity with respect to exhaust emission gas is changed. Therefore, when output waveforms are compared between different element temperatures, a difference is produced. In contrast thereto, in the case of a deteriorated air-fuel ratio sensor, the electrode portion is deteriorated, the activity is reduced. Therefore, even when the element temperature of the solid electrolyte is changed, the change of the output waveform is reduced. Therefore, the deterioration of the air-fuel ratio sensor can be detected by comparing outputs of the air-fuel ratio sensor at different temperatures of the solid electrolyte element.

Here, the air-fuel ratio sensor may be provided with the above characteristic and includes a linear air-fuel ratio sensor or an oxygen sensor. Further, although the invention is particularly effective in an air-fuel ratio sensor provided downstream from a catalyst, the invention can also be used in an air-fuel ratio sensor provided upstream from the catalyst.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
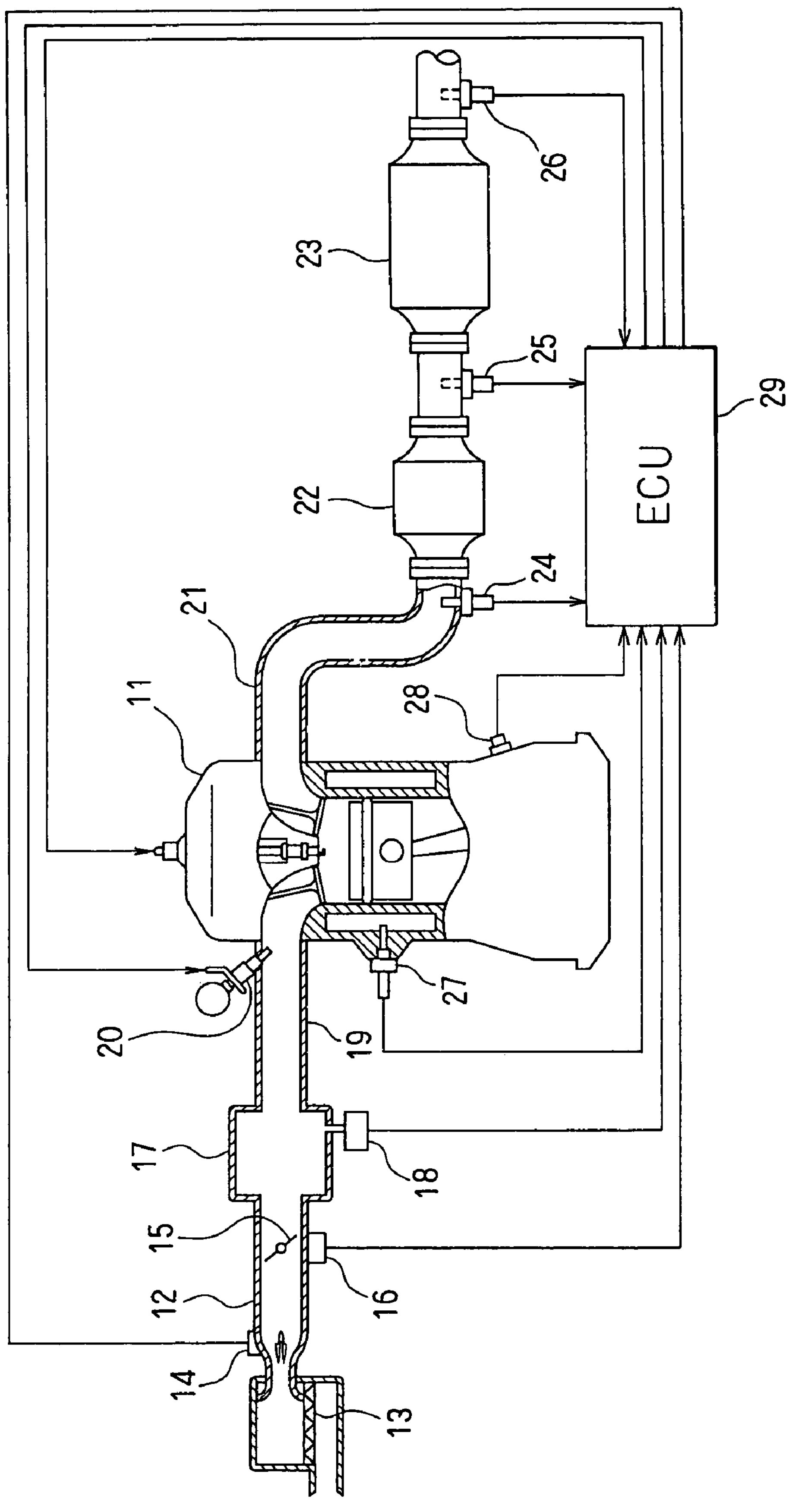
FIG. 1 is a schematic view of an engine system to which the present invention is applied.

In FIG. 1, an air-fuel ratio control system of a gasoline injection engine is shown. In this system, a fuel injection amount to the engine is controlled to a desired air-fuel ratio based on a detection result by air-fuel ratio sensors.

At the most upstream portion of an intake pipe 12 of an engine 11, an air cleaner 13 is provided. On the downstream of the air cleaner 13, an air flow meter 14 for detecting an intake air amount is provided. On the downstream of the air flow meter 14, a throttle valve 15 and a throttle opening degree sensor 16 for detecting a throttle opening degree are provided.

Further, on the downstream of the throttle valve 15, a surge tank 17 is provided. At the surge tank 17, an intake pipe pressure sensor 18 for detecting an intake pipe pressure is provided. Further, at the surge tank 17, an intake manifold 19 for introducing air to respective cylinders of the engine 11 is provided. In the vicinity of an intake port of the intake manifold 19 of each cylinder, a fuel injection valve 20 for injecting fuel is attached.

Meanwhile, at the middle of an exhaust pipe 21 (emission gas path) of the engine 11, an upstream catalyst 22 and a downstream catalyst 23 for reducing harmful components (CO, HC, NOx or the like) in emission gas are installed in series. In this case, the upstream catalyst 22 is formed in a comparatively small capacity such that warming up is finished at early time in starting and exhaust emission in starting is reduced. In contrast thereto, the downstream catalyst 23 is formed in a comparatively large capacity such that emission gas can sufficiently be cleaned even in a high load region increasing an amount of emission gas.

Further, on the upstream of the upstream catalyst 22, a linear air-fuel ratio sensor 24 for outputting a linear air-fuel ratio signal in accordance with an air-fuel ratio of emission gas is provided. On the downstream of the upstream catalyst 22 and on the downstream of the downstream catalyst 23, a first oxygen sensor 25 and a second oxygen sensor 26 are provided. Those sensors 25 and 26 have a so-called Z characteristic in which outputs thereof are respectively changed comparatively rapidly in the vicinity of a stoichiometric air-fuel ratio. Hereinafter, a combination of the linear air-fuel ratio sensor and the oxygen sensors is described as an air-fuel ratio sensor. Further, at a cylinder block of the engine 11, a cooling water temperature sensor 27 for detecting cooling water temperature and a crank angle sensor 28 for detecting an engine rotational number NE are attached.

Outputs of the various sensors are inputted to an engine control circuit (hereinafter, referred to as "ECU") 29. The ECU 29 is mainly constituted by a microcomputer and controls, for example, an air-fuel ratio of emission gas by a feedback control by executing a program stored in ROM (storage medium) included therein.

According to the first embodiment, the air-fuel ratio of emission gas is controlled by a known feedback control manner.

Figure 2:
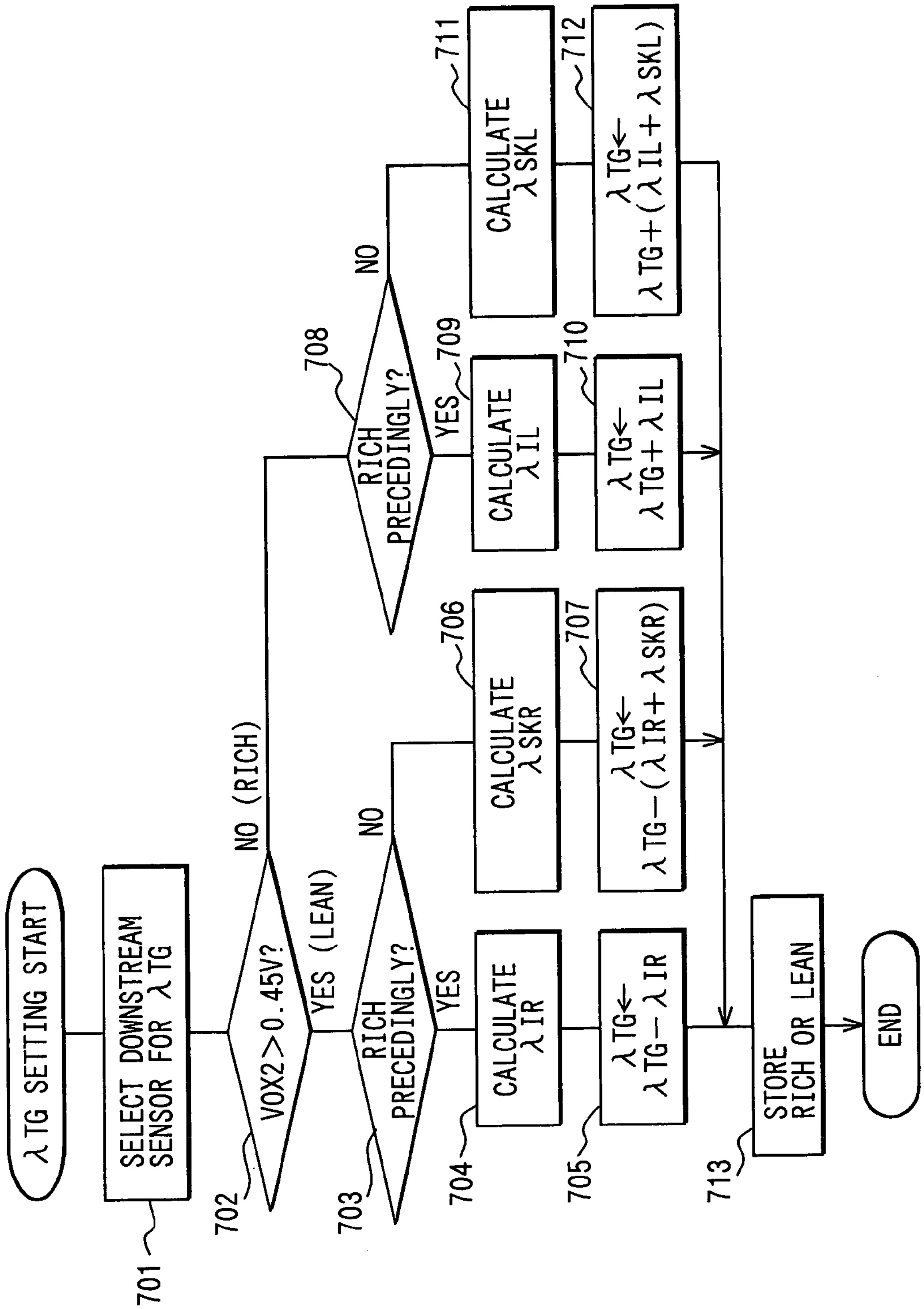
FIG. 2 is a flowchart of processing of setting a target air-fuel ratio according to a first embodiment of the present invention.

FIG. 2 is a flowchart of an air-fuel ratio feedback control when the linear air-fuel ratio sensor 24 is used as an air-fuel ratio sensor on the upstream of the catalyst and either one of the first oxygen sensor 25 and the second oxygen sensor 26 is switched to use as an air-fuel ratio sensor on the downstream of the catalyst.

Figure 3:
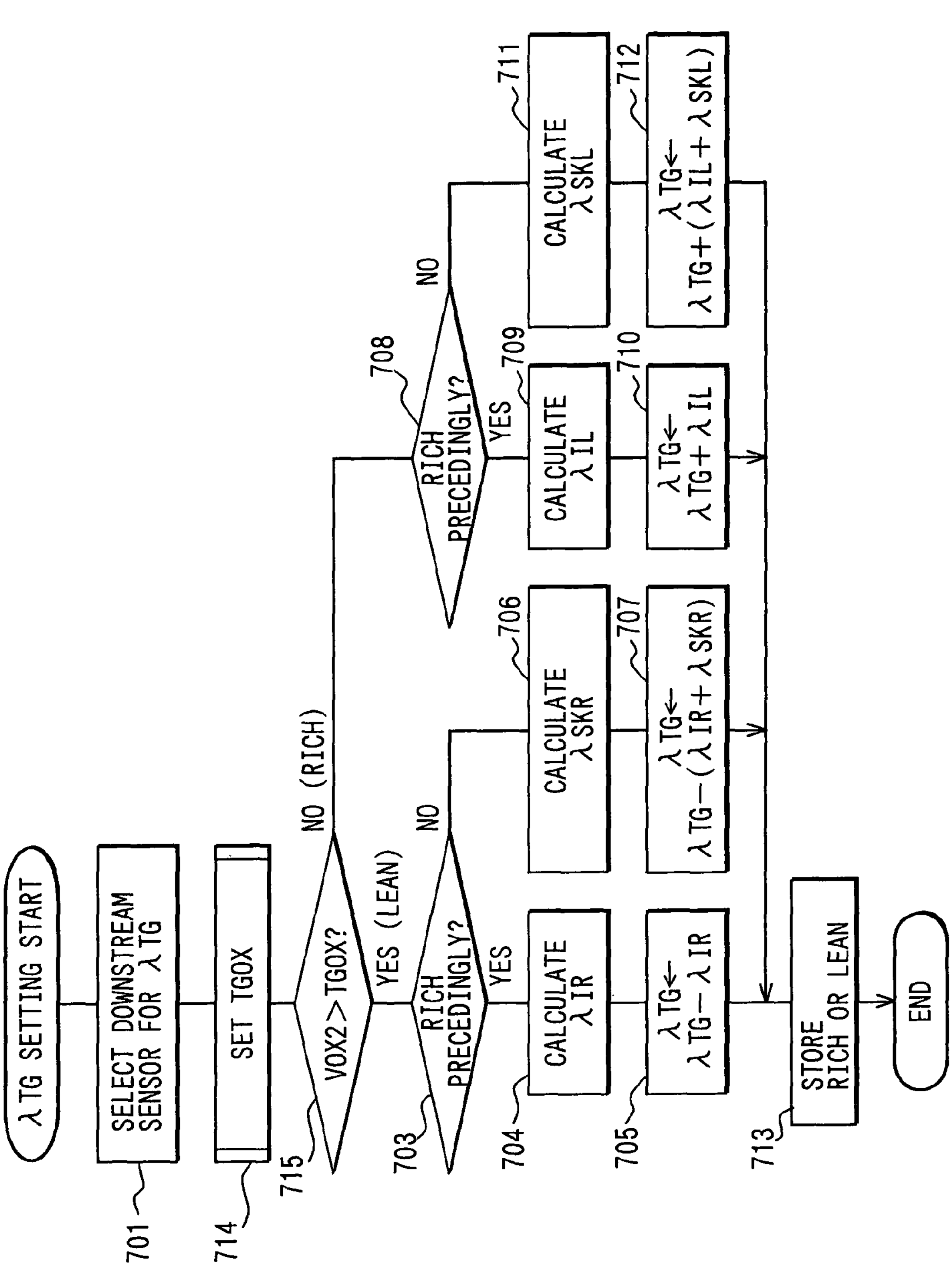
FIG. 3 is a flowchart of processing of setting a target air-fuel ratio in a modification of the first embodiment.
Figure 4:
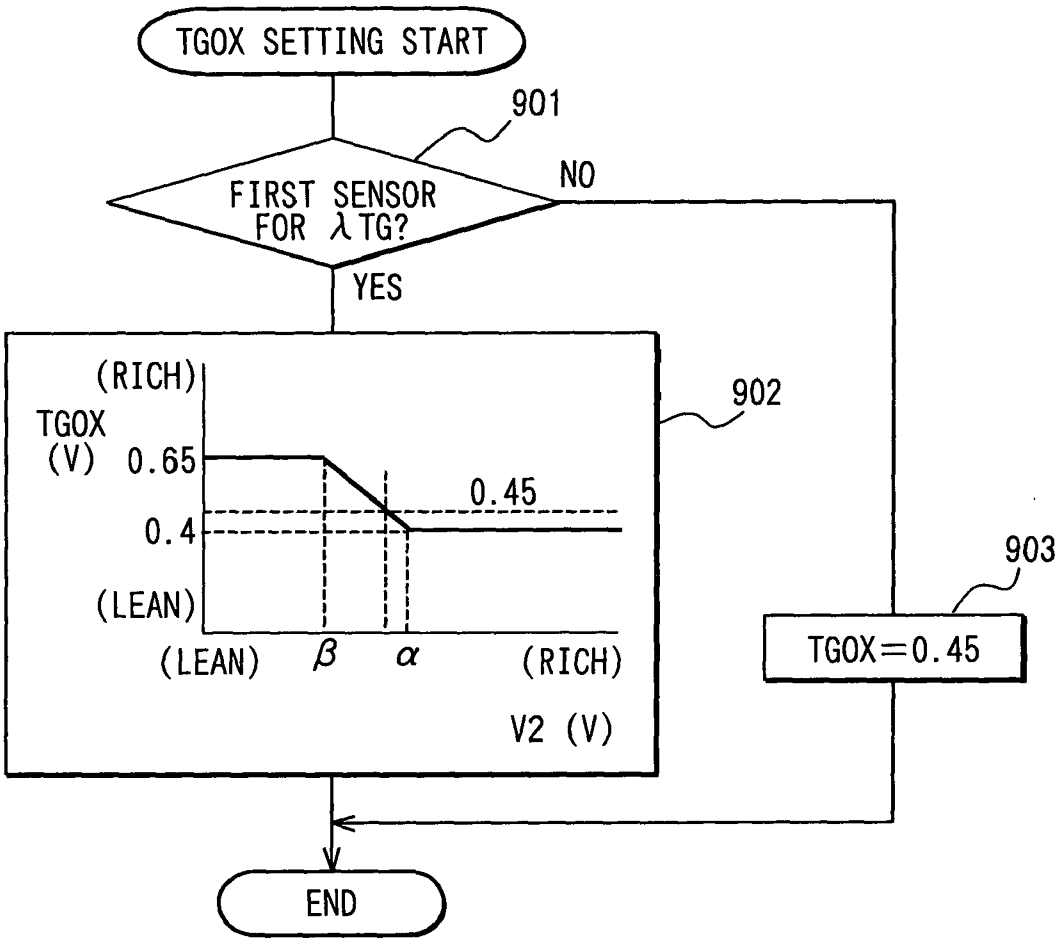
FIG. 4 is a flowchart of processing of setting a target output voltage of a first oxygen sensor of the modification according to the first embodiment.

Further, FIG. 3 and FIG. 4 are flowcharts of other air-fuel ratio feedback control when the second oxygen sensor 26 is used in addition to the linear air-fuel ratio sensor 24 and the first oxygen sensor 25 of FIG. 1.

First, processing of a target air-fuel ratio setting program of FIG. 2 will be explained. When the program is started, at step 701, the oxygen sensor on the downstream used for setting a target air-fuel ratio $\lambda$TG is selected form the first oxygen sensor 25 and the second oxygen sensor 26.

For example, in low load operation having a small flow rate of emission gas, emission gas can considerably be cleaned only by the upstream catalyst 22. Therefore, response of the air-fuel ratio control is excellent when the first oxygen sensor 25 is used as the sensor on the downstream used for setting the target air-fuel ratio $\lambda$TG. However, when the emission gas flow rate is increased, an emission gas component amount passing through the upstream catalyst 22 without being cleaned at inside thereof is increased. Therefore, it is necessary to clean emission gas by effectively using both of the upstream catalyst 22 and the downstream catalyst 23. In this case, it is preferable to carry out the air-fuel ratio feedback control also in consideration of the state of the downstream catalyst 23. Therefore, it is preferable to use the second oxygen sensor 26 as the sensor on the downstream used for setting the target air-fuel ratio $\lambda$TG.

Further, the shorter the delay time by which a change in the air-fuel ratio of emission gas emitted from the engine 11 (a change in an output of the air-fuel ratio sensor 24 on the upstream of the upstream catalyst 22) emerges as a change in an output of the first oxygen sensor 25, it signifies, the larger the emission gas component amount passing through the upstream catalyst 22 without being cleaned at inside thereof (that is, a cleaning efficiency is reduced). Therefore, when the delay time of the change in the output of the first oxygen sensor 25 is short, it is preferable to use the output of the second oxygen sensor 26 as the sensor on the downstream used in setting the target air-fuel ratio $\lambda$TG.

Hence, a condition of selecting the second oxygen sensor 26 as the sensor on the downstream used in setting the target air-fuel ratio $\lambda$TG is:

<1> the delay time (or period) by which the change in the air-fuel ratio of emission gas emitted from the engine 11 (the change in the output of the linear air-fuel ration sensor 24) emerges as the change in the output of the first oxygen sensor 25 is shorter than a predetermined period, or <2> the intake air amount (emission gas flow rate) is equal to or larger than a predetermined value.

When either one of the two conditions <1> and <2> is satisfied, the second oxygen sensor 26 is selected and when both of the conditions are not satisfied, the first oxygen sensor 25 is selected. Further, the second oxygen sensor 26 may be selected when both of conditions <1> and <2> are satisfied.

After selecting the sensor on the downstream used for setting the target air-fuel ratio $\lambda$TG in this way, the processing proceeds to step 702 and determines rich or lean by whether output voltage VOX2 of the selected oxygen sensor is higher or lower than the target output voltage (for example, 0.45V) in correspondence with the stoichiometric air-fuel ratio ($\lambda$=1). Here, in the case of lean, the processing proceeds to step 703 and determines whether the air-fuel ratio is lean also at preceding time. When the air-fuel ratio is lean both in preceding time and current time, the processing proceeds to step 704 and calculates a rich integration amount $\lambda$IR from a data map in accordance with a current intake air amount QA.

Figures 5A, 5B, 6:
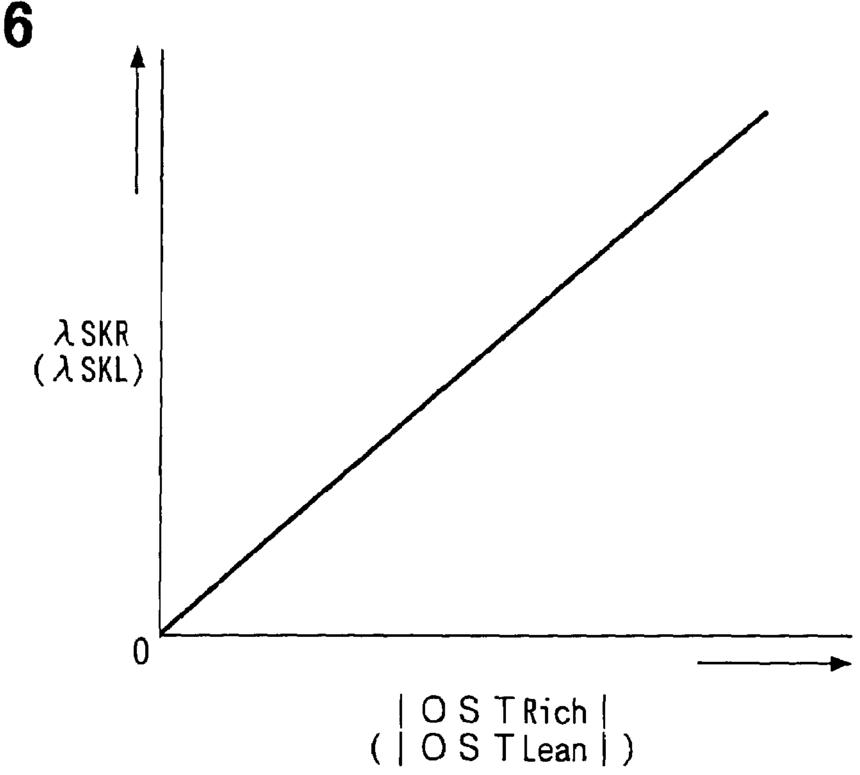
FIGS. 5A and 5B are data maps for setting a rich integration amount and a lean integration amount according to the first embodiment.
FIG. 6 is a map for setting a proportional amount of the first embodiment.

As maps of the rich integration amount $\lambda$IR, a map for the upstream catalyst downstream sensor (first oxygen sensor) is stored as shown in FIG. 5A, and a map for the downstream catalyst downstream sensor (second oxygen sensor) is stored as shown in FIG. 5B. Either one of the maps is selected in accordance with the sensor used. A map characteristic of the rich integration amount $\lambda$IR is set such that the larger the intake air amount QA, the smaller the rich integration amount $\lambda$IR. At a region where the intake air amount QA is small, the rich integration amount $\lambda$IR is set to be slightly larger in the map for the downstream catalyst downstream sensor than in the map for the upstream catalyst downstream sensor. After calculating the rich integration amount $\lambda$IR, the processing proceeds to step 705, corrects the target air-fuel ratio $\lambda$TG to a rich side by $\lambda$IR, stores rich or lean at that time (step 713) and finishes the program.

Further, when the air-fuel ratio has been rich at preceding time and is inverted to lean at current time, the processing proceeds from step 703 to step 706 and calculates a proportional (skip) amount $\lambda$SKR to the rich side in accordance with the rich component storage amount OSTRich of the catalyst. Further, the rich component storage amount OSTRich is calculated in the manner known in the art.

A map characteristic of FIG. 6 is set such that the smaller the absolute value of the rich component storage amount OSTRich, the smaller the rich skip amount $\lambda$SKR. After calculating the skip amount $\lambda$SKR, the processing proceeds to step 707, corrects the target air-fuel ratio $\lambda$TG to the rich side by $\lambda$IR+$\lambda$SKR, stores rich or lean at that time (step 713) and finishes the program.

Meanwhile, at step 702, when the output voltage VOX2 of the oxygen sensor is rich, the processing proceeds to step 708 and determines whether the air-fuel ratio has been rich also at preceding time. When the air-fuel ratio is rich both at preceding time and current time, the processing proceeds to step 709 and calculates a lean integration amount $\lambda$IL from the maps shown in FIGS. 5A and 5B in accordance with the current intake air amount QA. As the maps of the lean integrating amount $\lambda$IL, a map for the upstream catalyst downstream sensor (first oxygen sensor) is stored as shown in FIG. 5A and a map for the downstream catalyst downstream sensor (second oxygen sensor) is stored as shown in FIG. 5B. Either one of the maps is selected in accordance with a sensor selected as the sensor on the downstream.

A map characteristic of the lean integration amount $\lambda$IL of FIG. 5A and FIG. 5B is set such that the larger the intake air amount QA, the smaller the lean integration amount $\lambda$IL and at a region where the intake air amount QA is small, the lean integration amount $\lambda$IL is set to be slightly larger in the map for the downstream catalyst downstream sensor than in the map for the upstream catalyst downstream sensor. After calculating the lean integration amount $\lambda$IL, the processing proceeds to step 710, corrects the target air-fuel ratio $\lambda$TG to the lean side by $\lambda$IL, stores rich or lean at that time (step 713) and finishes the program.

Further, when the air-fuel ratio has been on the lean side at preceding time and is inverted to the rich side at current time, the processing proceeds from step 708 to step 711 and calculates the skip amount $\lambda$SKL to the lean side from the map shown in FIG. 6 in accordance with the lean component storage amount OSTLean of the catalyst. Further, processing of calculating the lean component storage amount OSTLean is performed in the known manner.

The map characteristic of FIG. 6 is set such that the smaller the lean component storage amount OSTLean, the smaller the lean skip amount λSKL. Thereafter at step 712, the operation corrects the target air-fuel ratio λTG by λIL+λSKL, stores rich or lean at that time (step 713) and finishes the program.

As is apparent from the map of FIG. 6, when the rich component storage amount OSTRich or the lean component storage amount OSTLean is reduced by the deterioration of the catalysts 22 and 23, the rich skip amount λSKR or the lean skip amount λSKL is gradually set to a small value. Therefore, it can be prevented beforehand that the harmful component is emitted by carrying out excessive correction exceeding adsorption limits of the catalysts 22 and 23.

Next, other examples of processing of setting the target air-fuel ratio will be explained in reference to flowcharts of FIG. 3 and FIG. 4.

ECU 29 changes a target output voltage TGOX of the first oxygen sensor 25 in accordance with the output of the second oxygen sensor 26 when the first oxygen sensor 25 is selected as the sensor on the downstream used in setting the target air fuel ratio λTG of the air-fuel ratio feedback control by executing a target air-fuel ratio setting program of FIG. 3 and a target output voltage setting program of FIG. 4. A difference from of FIG. 2 will mainly be explained.

In the target air-fuel ratio setting program of FIG. 3, first, at step 701, the sensor on the downstream used in setting the target air-fuel ratio λTG is selected from the oxygen sensor 25 on the downstream of the upstream catalyst 22 and the oxygen sensor 26 on the downstream of the downstream catalyst 23, and thereafter the processing proceeds to step 714 and sets the target output voltage TGOX of the sensor 26 on the downstream used for setting the target air-fuel ratio λTG by executing a target output voltage setting program of FIG. 4.

Thereafter, the processing proceeds to step 715, determines rich or lean by whether the output voltage VOX2 of the selected oxygen sensor is higher or lower than the target output voltage TGOX, calculates the target air-fuel ratio λTG by the above method at steps 703 through 713 in accordance with a result of the determination, stores rich or lean at that time and finishes the program.

Next, processing of the target output voltage setting program of FIG. 4 executed at step 714 of FIG. 3 will be explained. When the program is started, first, at step 901, it is determined whether the first oxygen sensor 25 is selected as the sensor on the downstream used for setting the target air-fuel ratio λTG. When the first oxygen sensor 25 is selected as the sensor on the downstream used for setting the target air-fuel ratio λTG, the processing proceeds to step 902 and calculates the target output voltage TGOX in accordance with current output voltage V2 of the second oxygen sensor 26 from a map of the target output voltage TGOX constituting a parameter by the output voltage of the second oxygen sensor 26.

In this case, the map of the target output voltage TGOX is set such that when the output voltage of the second oxygen sensor 26 (an air-fuel ratio of a gas flowing out from the downstream catalyst 23) falls in a predetermined range (β≦output voltage≦α) in the vicinity of the stoichiometric air-fuel ratio, the target output voltage TGOX is reduced (becomes lean) as the output of the second oxygen sensor 26 is increased (becomes rich). Further, in a region in which the output of the second oxygen sensor 26 is larger than a predetermined value α, the target output voltage TGOX becomes a predetermined lower limit value (for example, 0.4V). In a region in which the output of the second oxygen sensor 26 is smaller than a predetermined value β, the target output voltage TGOX becomes an upper limit value (for example, 0.65V).

Thereby, the target output voltage TGOX of the first oxygen sensor 25 is set to fall in a range in which an adsorption amount of an emission gas component of the downstream catalyst 23 becomes equal to or smaller than a predetermined value or the air-fuel ratio of emission gas flowing in the downstream catalyst 23 falls in a range of a predetermined cleaning window.

Meanwhile, when the second oxygen sensor 26 is selected as the sensor on the downstream used for setting the target air-fuel ratio λTG, the processing proceeds from step 901 to step 903 and sets the target output voltage TGOX to a predetermined value (for example, 0.45V).

Figure 7:
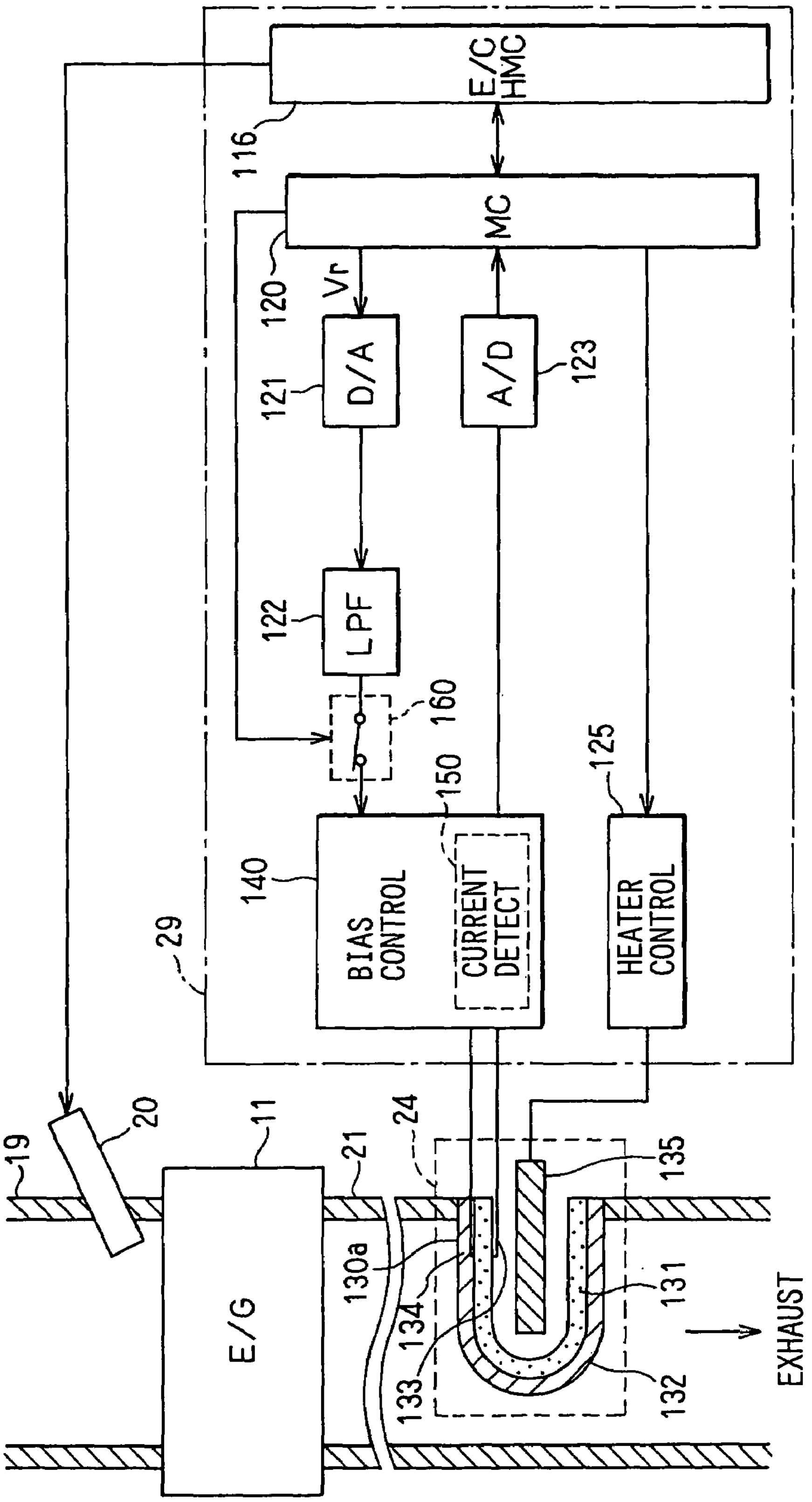
FIG. 7 is a schematic view of an apparatus for detecting an air-fuel ratio and impedance according to the first embodiment.

In FIG. 7, the linear air-fuel ratio sensor 24 is projected into the exhaust pipe 21 and the sensor 24 is constituted by a cover 132, a sensor main body 131 and a heater 135. The cover 134 is formed in a channel-like shape in a section thereof and a number of small holes communicating inside and outside of the cover 134 are formed at a peripheral wall thereof. The sensor main body 131 as the sensor element portion generates a voltage in correspondence with an oxygen concentration in an air-fuel ratio lean region, or a concentration of uncombusted gas (CO, HC, H2 or the like) in an air-fuel ratio rich region.

The heater 135 is contained at inside of an atmosphere side electrode layer 134 for heating the sensor main body (atmosphere side electrode layer, solid electrolyte layer, emission gas side electrode layer) by heat generating energy thereof. The heater 135 is provided with a heat generating capacity sufficient for activating the sensor main body 131.

ECU 29 is provided with a microcomputer (MC) 120 constituting the center of internal operation thereof. The microcomputer 120 is connected to a host microcomputer 116 for realizing fuel injection control or ignition control communicatably to each other. The linear air-fuel ratio sensor 24 is attached to the exhaust pipe 21 extended from an engine main body of the engine 11 and an output thereof is detected by the microcomputer 120. The microcomputer 120 is constituted by well-known CPU, ROM, RAM, backup RAM and the like for executing various operation processing, not illustrated, for controlling a heater control circuit 125 and a bias control circuit 140 according to the prescribed controlling program.

Here, a bias instruction signal Vr is inputted to the bypass control circuit 140 via a D/A converter 121, a low pass filter (LPF) 122 and a switch 160. Further, the output of the linear air-fuel ratio sensor 24 in correspondence with the air-fuel ratio (oxygen concentration) from time to time is detected and a detected value thereof is inputted to the microcomputer 120 via an A/D converter 123. Further, heater voltage and heater current are detected by the heater control circuit 125, mentioned later, and a detected value thereof is inputted to the microcomputer 120.

Figure 8A:
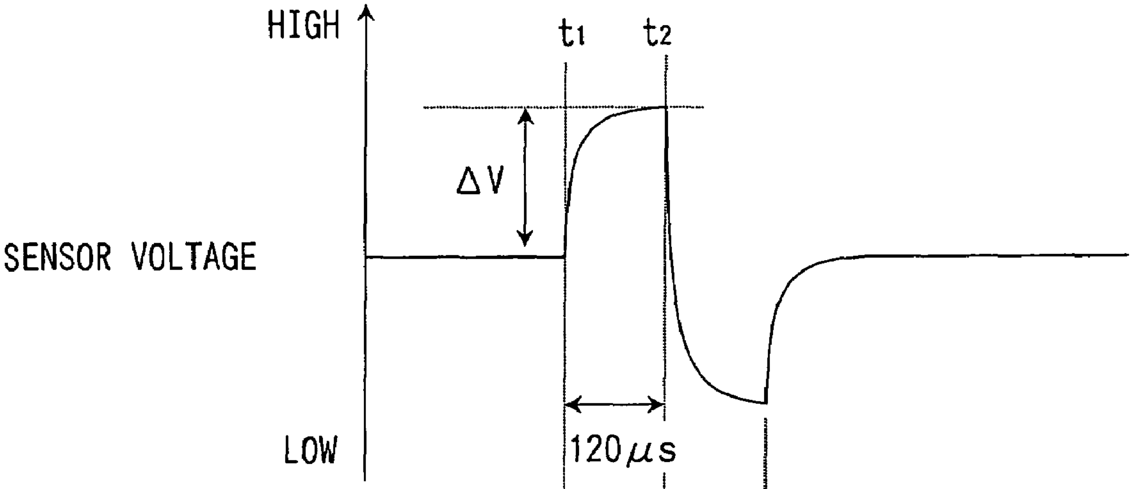
FIGS. 8A and 8B are time charts in detecting the impedance.
Figure 8B:
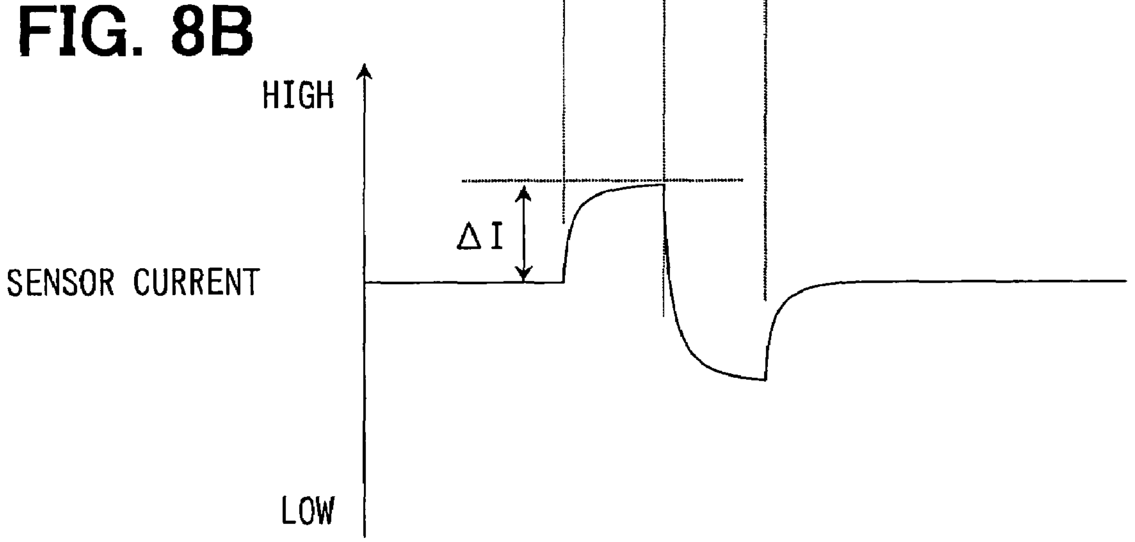

Further, the predetermined bias instruction signal Vr is applied to an element, a change between predetermined time t1 and t2 shown in FIGS. 8A and 8B, that is, an element voltage change ΔV and an element current change ΔI are detected and an element impedance is detected by the following equation.

$$\text{impedance}=\Delta V/\Delta I$$

Figure 9:
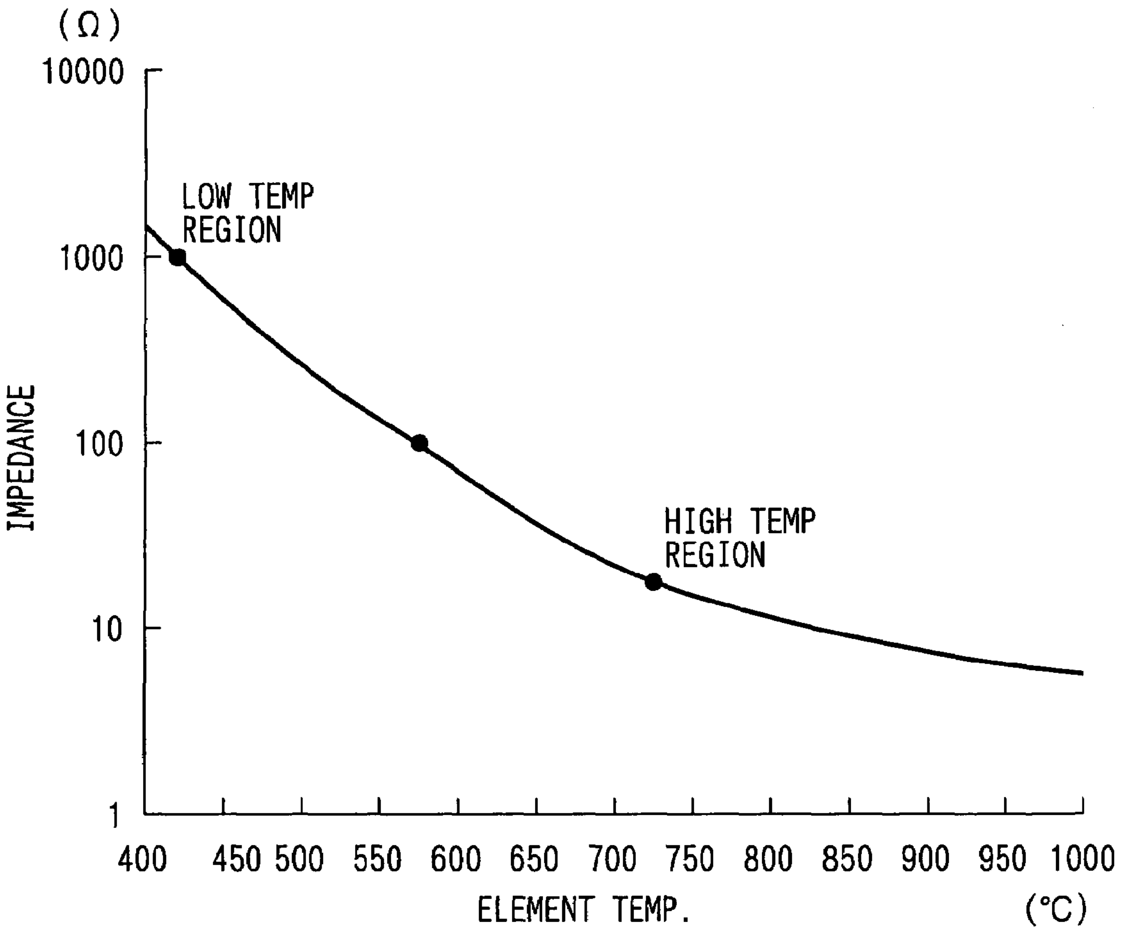
FIG. 9 is an impedance characteristic diagram of an oxygen sensor.

The detected element impedance value is inputted to the microcomputer 120. The element impedance is provided with a strong correlation with element temperature as shown by FIG. 9 and the element temperature of the air-fuel ratio sensor can be controlled by controlling a heater provided in the air-fuel ratio sensor by a duty control such that the element impedance becomes a predetermined value.

Further, similarly in the first oxygen sensor 25 and the second oxygen sensor 26, element temperature of the oxygen sensor can be controlled by detecting element impedance and controlling a heater provided to each of the first and the second oxygen sensor 25 and 26 by a duty control such that the element impedance becomes a predetermined value.

Figure 10:
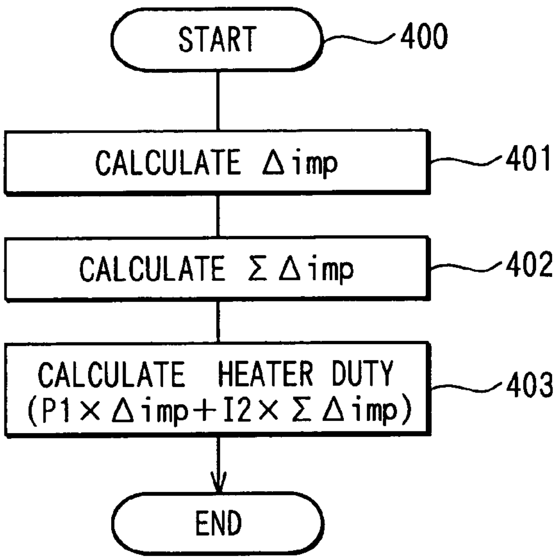
FIG. 10 is a flowchart of controlling a heater of the oxygen sensor of the first embodiment.

As a method therefor, according to the embodiment, as shown by FIG. 10, there is adopted a method of carrying out PI control (proportional, integral) by a deviation between actually detected element impedance and target impedance calculated from the target element temperature, and the element temperature of the linear A/F sensor 24 (first oxygen sensor 25, second oxygen sensor 26) is controlled by the method.

In the flowchart shown in FIG. 10, program processing is executed at predetermined timings (step 400).

First, at step 401, a deviation (Δimp) between the target impedance calculated from the target element temperature and the element impedance detected by the element impedance detecting circuit is calculated. At step 402, an integrated value of the impedance deviation (ΣΔimp) for carrying out integral control is calculated. At step 403, heater duty is calculated from an equation shown below by using the deviation, an integral value, a proportional coefficient P1 and an integral coefficient I2.

$$\text{heater duty (\%)} = P1 \times \Delta\text{imp} + I2 \times \Sigma\Delta\text{imp}$$

The heater duty calculated here is inputted to the heater control circuit designated by numeral 125 of FIG. 7 and heater control of the linear air-fuel ratio sensor 24 (first oxygen sensor 25, second oxygen sensor 26) is carried out.

Here, the heater duty is a control amount of a heat generating amount for controlling temperature of the oxygen sensor element and based on power (W). In order to control temperature constant, it is preferable to control power constant. When temperature is controlled by the heater duty, in order to prevent temperature from changing by changing the supplied voltage, a correction relative to reference voltage (for example, 13.5V), that is, a correction by power×(13.5/voltage)$^2$ is carried out.

In recent years, there is proposed a laminated type air-fuel ratio sensor for constituting an element and heater by an integrated structure for promoting heater function, the proposal is applicable naturally to such a sensor and to any sensor so far as the sensor is the air-fuel ratio sensor arranged with an electrode at a solid electrolyte element regardless of a kind thereof.

Figure 11:
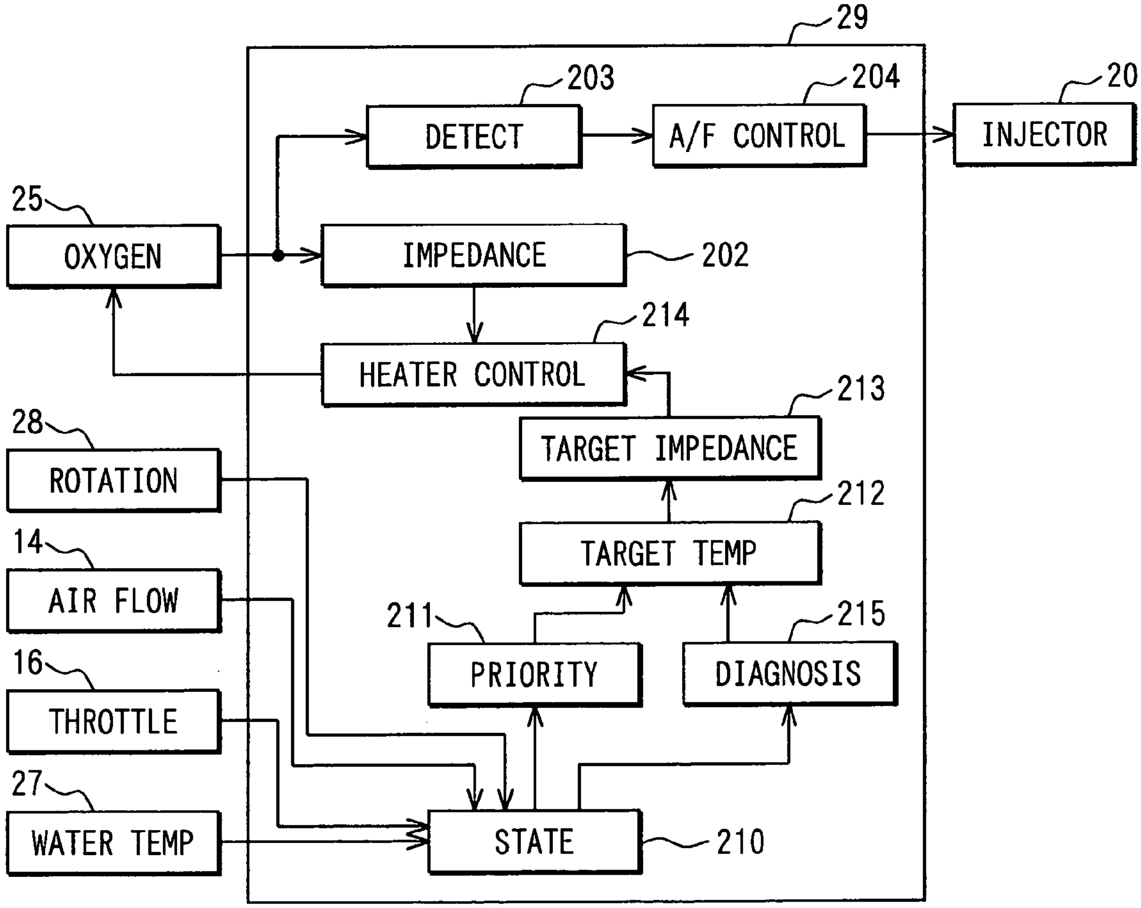
FIG. 11 is a block diagram of controlling an element temperature of the oxygen sensor.

The ECU 29 is constructed and programmed as shown in FIG. 11. The first oxygen sensor (oxygen sensor) 25 detects gas output by the emission gas component (rich gas and leans gas) emitted from the engine by an output detecting circuit 203 of ECU 29 and calculates an air-fuel ratio control amount by an air-fuel ratio (A/F) control calculating block 204. Here, an amount of increasing or reducing the fuel injection amount is determined by comparing target voltage, not illustrated, and detected voltage. The fuel injection amount determined as the air-fuel ratio control amount is supplied to a fuel injector 20 and a desired fuel injection amount is injected. An impedance calculating block 202 calculates the element impedance as has been explained in reference to FIG. 7 and FIG. 8, a heater control amount is determined by a deviation from the target impedance set by a target impedance setting block 213 by a heater control amount calculating block 214. The heater is controlled such that the temperature of the sensor element of the first oxygen sensor 25 becomes desired temperature.

Here, the target impedance is calculated by the following procedure. An operating state is determined by an operating state determining block 210 by information from the crank angle sensor 28, the air flow meter 14, the throttle opening degree sensor 16 and the cooling water temperature sensor 27 showing the operating state of the engine.

Based on a result of determining the operating state, at a specific gas sensitivity priority determining block 211, it is determined whether a composition of emission gas emitted from the engine is mainly of rich gas or mainly of lean gas under a current operating condition or an operating state immediately thereafter. When it is determined that the composition is mainly of lean gas in a state in which NOx is liable to generate under high load or in accelerating by the specific gas sensitivity priority determining block 211, at a target element temperature setting block 212, the target element temperature is set to, for example, 720° C. in order to elevate the element temperature of the oxygen sensor to promote lean gas reactivity.

Conversely, when it is determined that the composition is mainly of rich gas (or mainly constituted by rich gas) in a state in which HC, CO is liable to generate under low temperature, low load or in decelerating by the specific gas sensitivity priority determining block 211, at the target element temperature setting block 212, the target element temperature is set to, for example, 420° C. in order to lower the element temperature of the oxygen sensor to promote rich gas reactivity.

Alternatively, at a diagnosis execution determining block 215, it is determined whether an operating state in which deterioration detection (diagnosis) of the first oxygen sensor 25 or the second oxygen sensor 26 is to be executed is brought about based on a result of determining the operating state at the operating state determining block 210.

When it is determined that the operating state in which the diagnosis is to be executed is brought about, at the target element temperature setting block 212, the element temperature of the oxygen sensor is controlled to a low temperature state (for example, 400° C.) for a predetermined period of time. Thereafter, the oxygen sensor element temperature is controlled to a high temperature state (for example, 700° C.) for a predetermined period of time.

Here, the target element temperature setting block 212 determines the target element temperature by putting priority on a determination result of the diagnosis execution determining block 215 more than a determination result of the specific gas sensitivity priority determining block. That is, when it is determined at the diagnosis execution determining block 215 that the operating state in which the diagnosis is to be executed is brought about, the target element temperature is set to the temperature for executing the diagnosis. Further, when it is determined at the diagnosis execution determining block 215 that the operating state in which the diagnosis is to be executed is not brought about, the target element temperature is set based on the result determined by the specific gas sensitivity priority determining block 211.

Next, reactivities of rich and lean gases of the oxygen sensor will be explained in reference to characteristic diagrams of FIG. 12 and FIG. 13.

Figure 12:
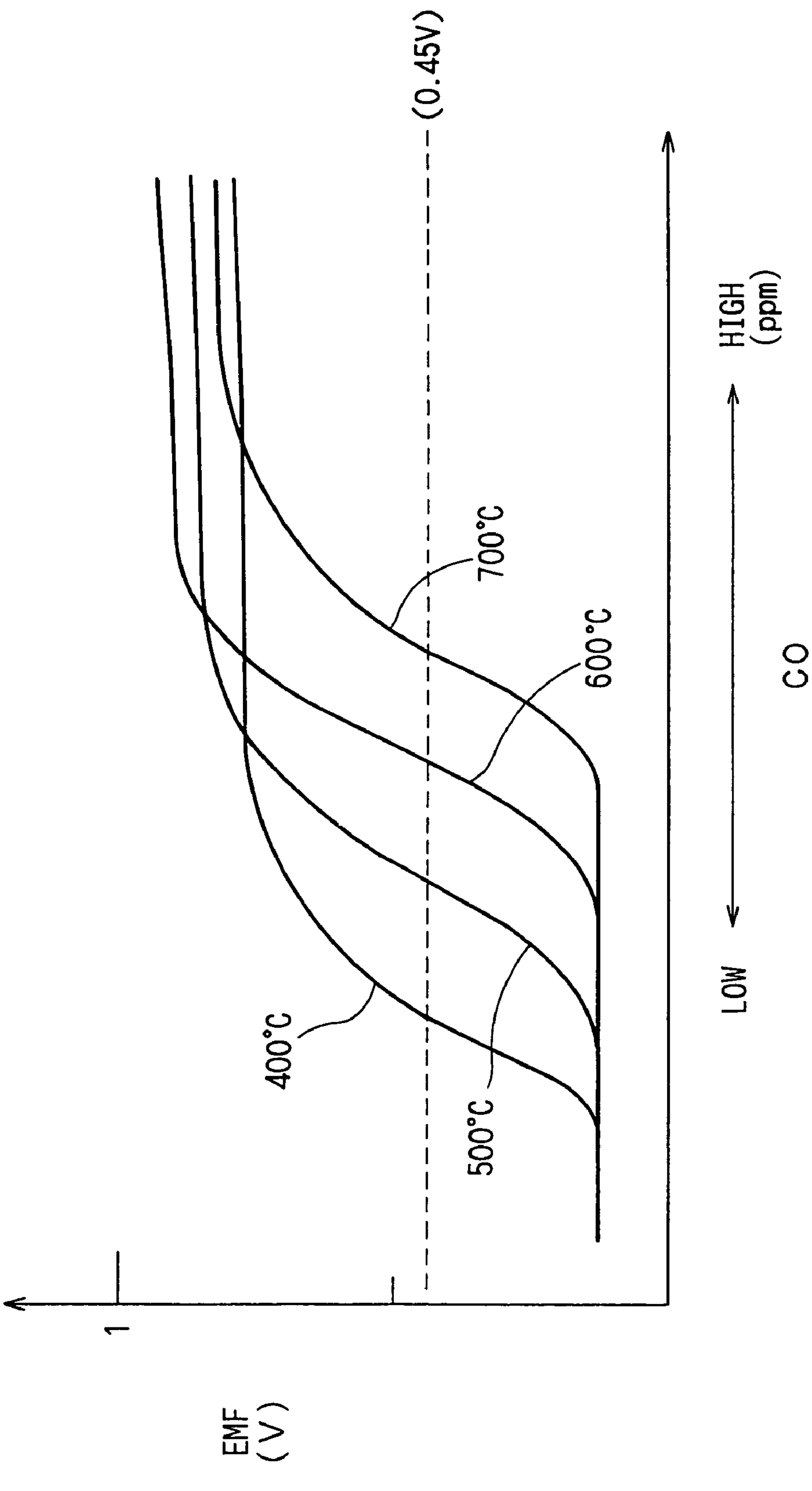
FIG. 12 is a CO reaction characteristic diagram of the oxygen sensor.

FIG. 12 shows a reactivity (electromotive force EMF) of an oxygen sensor with respect to carbon monoxide (CO) in nitrogen ($N_2$). As illustrated, although at low element temperature, the sensor reacts with a small amount of CO. As the element temperature is elevated, reactivity with low concentration CO is reduced. This is because there is a temperature characteristic in the reactivity of CO of the oxygen sensor electrode and because at low temperature of the element, a reaction shown below is accelerated and $O_2$ is deprived.

$$CO\ (adsorbed)+1/2\ O^{2-}(adsorbed)\leftrightarrows CO_2+2e^-$$

Figure 13:
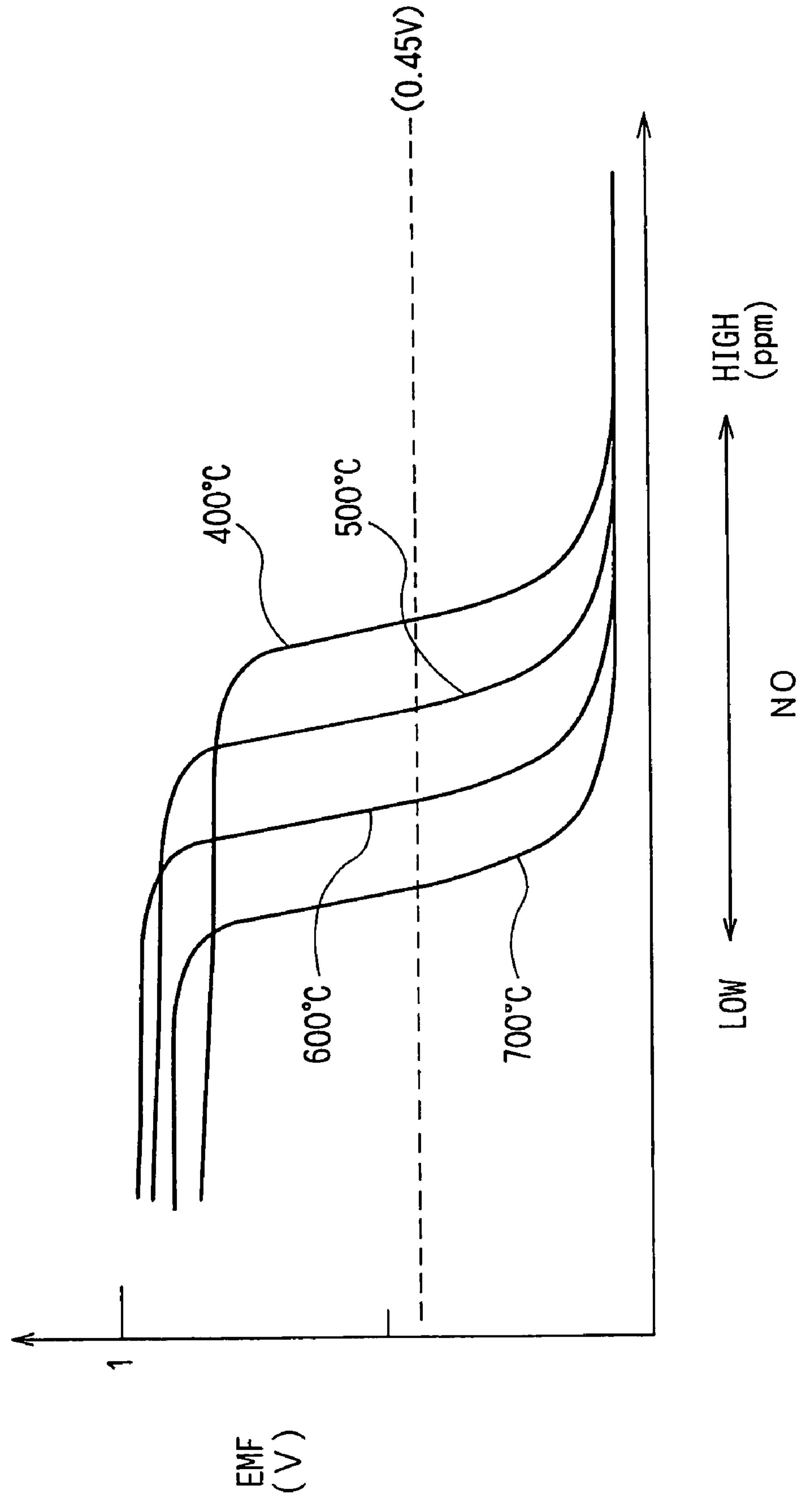
FIG. 13 is an NO reaction characteristic diagram of the oxygen sensor.

Further, FIG. 13 shows a reactivity (electromotive force EMF) of the oxygen sensor when nitrogen monoxide (NO) is introduced into an atmosphere of nitrogen ($N_2$) and carbon monoxide (CO). As illustrated, although in a high temperature state of the element, the sensor reacts with a small amount of NO, as the element temperature is lowered, the sensor does not react with low concentration NO. This is because at a surface of an electrode of the oxygen sensor and at an electrode, a reaction shown below is carried out. At high temperature region, in comparison with a low temperature region, combustion with rich gas (CO) and decomposition of NO of the electrode is further accelerated. Therefore, electromotive force is reduced on the low concentration side.

$$CO+NO\rightarrow CO_2+N_2$$

$$2NO+4e\rightarrow N_2+2O^{2-}$$

Based on the target temperature set by the target element temperature setting block 212 of FIG. 11, at the target impedance setting block 213, the target impedance is set from the relationship between the element impedance and the element temperature shown in FIG. 9. Further, the heater control amount is determined by comparing with the above detected value of the element impedance at the heater control amount calculating block 214.

Figure 14:
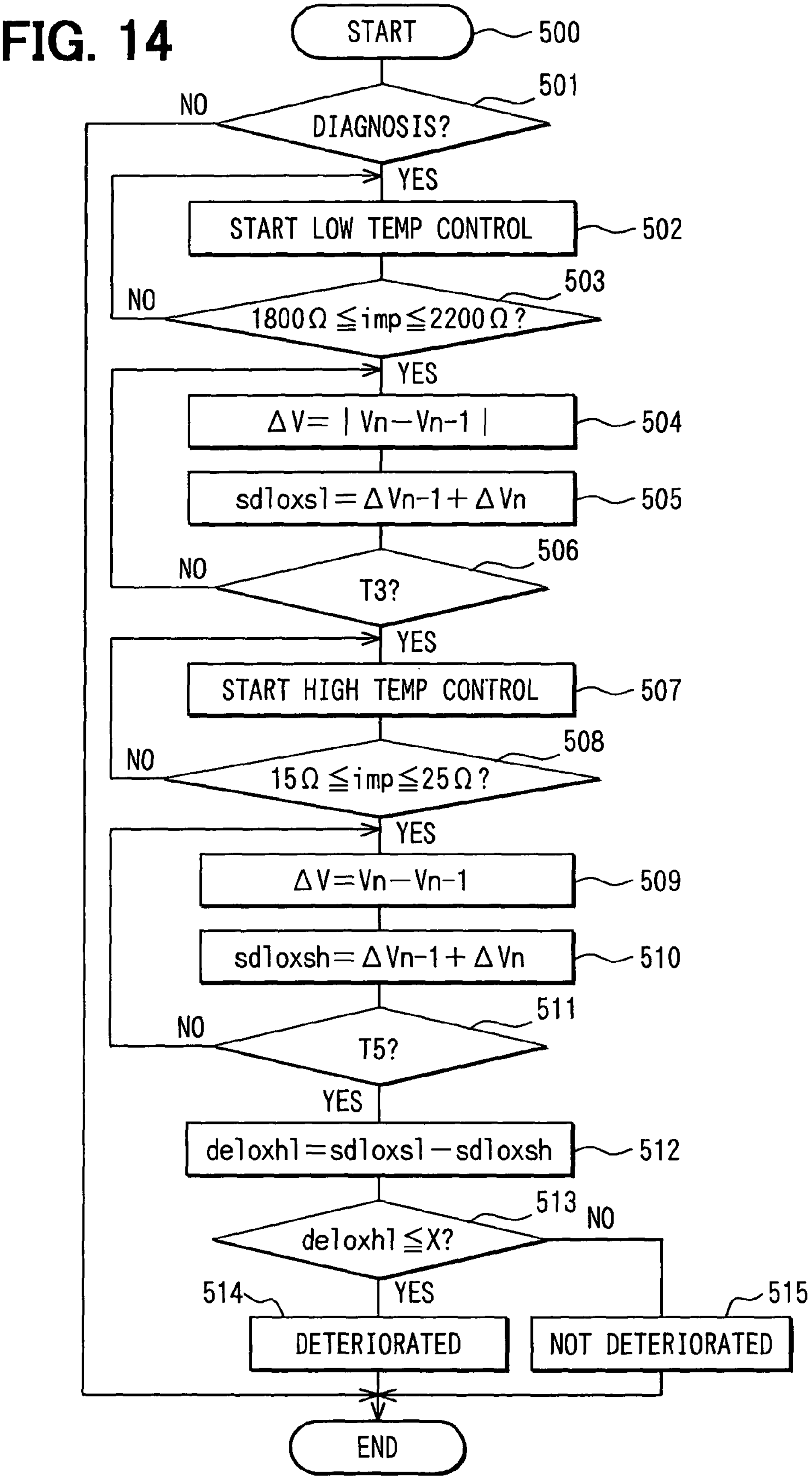
FIG. 14 is a flowchart of processing of detecting a deterioration of the oxygen sensor.

Next, diagnosis processing of the first oxygen sensor 25 will be explained in reference to a flowchart of FIG. 14. Further, although similar diagnosis processing is executed also with respect to the second oxygen sensor 26, an explanation thereof will be omitted here.

The routine is started at a predetermined timing of time or a number of times of injection (step 500). First, at step 501, a condition of executing diagnosis is determined based on whether an engine rotational speed or an intake air amount falls in a predetermined range, or whether catalyst temperature is equal to or lower than predetermined temperature. Here, it is preferable that the condition of executing diagnosis is a stable steady-state running state in order to promote accuracy of deterioration detection.

When it is determined that the condition of executing diagnosis is established at step 501, at step 502, low element temperature control is started by setting a target element impedance to 2000Ω such that element temperature of the first oxygen sensor 25 becomes low (for example, 400° C.).

At step 503, it is determined whether the element impedance (imp) falls in a predetermined range in order to detect whether the element temperature is desired temperature. Here, processing at step 502 and at step 503 are repeated until the impedance falls in the predetermined range. When the impedance falls in the predetermined range, the processing proceeds to step 504.

At step 504, an output voltage change speed of the first oxygen sensor 25 is calculated by calculating a change amount ΔV between predetermined timings of the output voltage of the first oxygen sensor 25 in the low element temperature state.

$$\Delta V=|Vn-Vn-1|$$

Here, notation Vn designates a current value of the first oxygen sensor 25 and notation Vn−1 is a preceding value of the output of the first oxygen sensor 25.

Further, although according to the embodiment, the change speed is calculated without differentiating a rich direction of the oxygen sensor (change speed is a positive value) and a lean direction thereof (change speed is a negative value), the change speed may be calculated only in a specific direction of rich or lean.

At successive step 505, in order to promote accuracy of deterioration detection, a change speed integrated value (sd1oxs1) is calculated based on the following equation by summing up the change speed for a predetermined time period.

$$sd1oxs1=\Delta Vn-1+\Delta Vn$$

Here, notation ΔVn designates a current value of the change amount ΔV and the notation ΔVn−1 designates a preceding value of the change amount ΔV.

Next, at step 506, it is determined whether a predetermined time period T3 has elapsed. Here, processing of step 504 to step 506 are repeated until it is determined that the predetermined time period T3 elapses. When it is determined that the predetermined time period T3 has elapsed at step 506, the processing proceeds to step 507.

At step 507, the element temperature control is switched to high element temperature control. According to the embodiment, the target impedance is set to 25Ω such that the element is at high temperature (for example, 700° C.).

At successive step 508, it is determined whether the element impedance (imp) falls in a predetermined range (15Ω≦imp≦25Ω). Here, processing at step 507 and at step 508 is repeated until it is determined that the element impedance falls in the predetermined range. When it is determined that the element impedance falls in the predetermined range at step 508, similar to the processing at low temperature, at step 509, an oxygen sensor voltage change speed at high temperature ΔV (=|Vn−Vn−1|) is calculated and at step 510, the oxygen sensor voltage change speed integrated value sd1oxsh (=ΔVn−1+ΔV) is calculated.

Next, it is determined whether a predetermined time period T5 has elapsed at step 511. Here, when the predetermined time period has not elapsed, processing of from step 509 to step 511 are repeated until the predetermined time period elapses. When the predetermined time period has elapsed, the processing proceeds to step 512.

At step 512, a deviation amount (de1oxh1) between the change speed integrated value sd1oxs1 at low temperature and the change speed integrated value sd1oxsh at high temperature is calculated by the following equation.

$$de1oxh1=sd1oxs1-sd1oxsh$$

Next at step 513, the change speed integrated value deviation amount de1xh1 and a previously set predetermined value are compared. Here, when the change speed integrated value deviation amount de1oxh1 is smaller than the previously set predetermined value X, the processing proceeds to step 514 and determines that the first oxygen sensor is deteriorated. Further, when the change speed integrated value deviation amount de1oxh1 is larger than the previously set predetermined value, the processing proceeds to step 515 and determines that the first oxygen sensor is normal and not deteriorated.

Next, operation of the embodiment will be explained in reference to time charts of FIG. 15.

Here, (a) shows whether the condition of executing the diagnosis processing is established. Further, (b) shows whether the element temperature control is requested at normal control time when the diagnosis processing are not executed, or low element temperature control time or high element temperature control time when the diagnosis processing are executed. Further, (c) shows the element temperature of the solid electrolyte. (d) shows the output of the first oxygen sensor when the sensor is deteriorated and (e) shows the output of the first oxygen sensor when the sensor is normal. (f) shows the change speed integrated value sd1oxs1 at low element temperature control time and (g) shows the change speed integrated value sd1oxsh at high element temperature control time. (h) shows the change speed integrated value deviation amount de1xh1. Further, (i) shows an abnormality detection flag.

Figure 15:
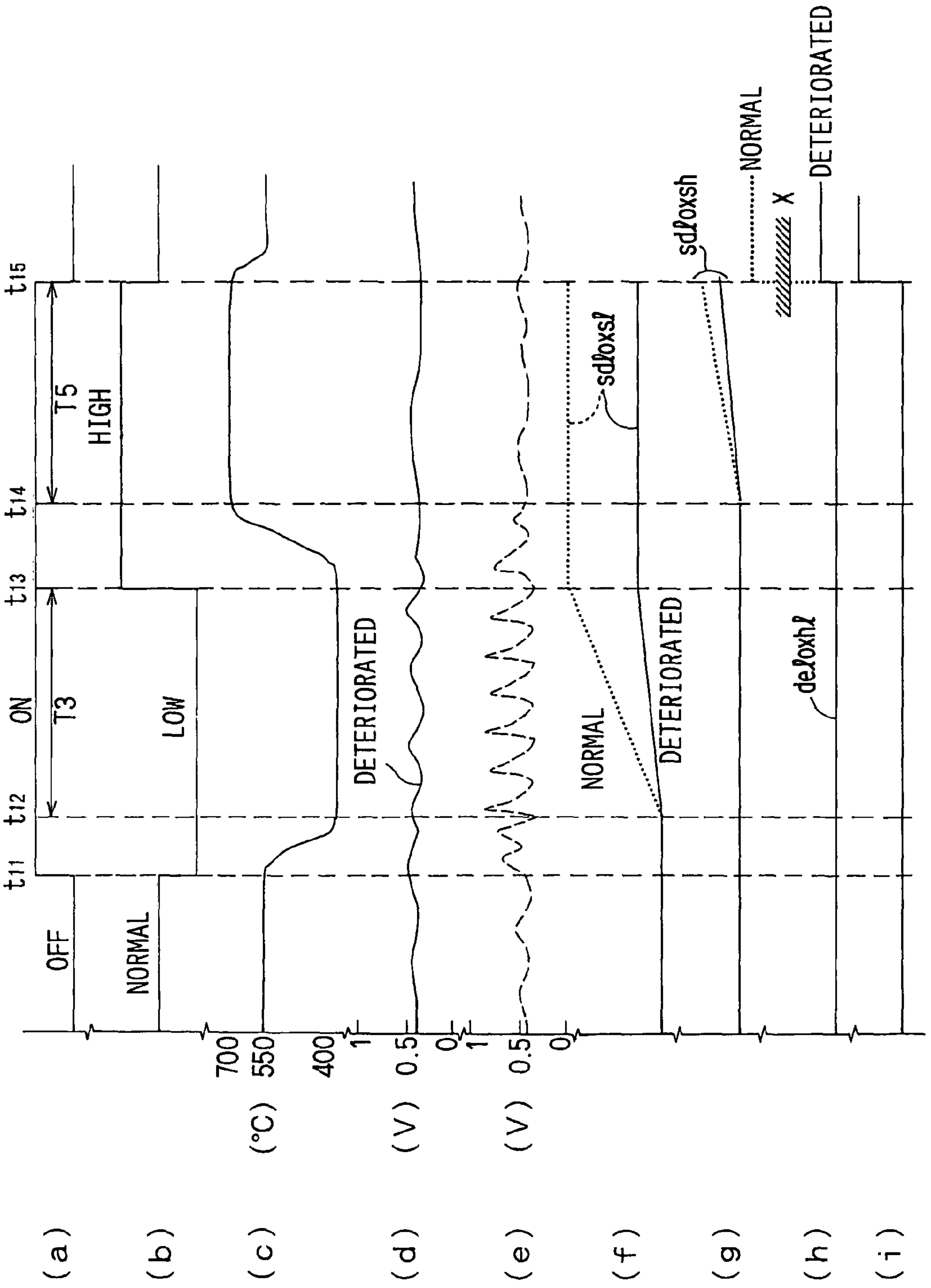
FIG. 15 is a time chart showing operation in detecting the deterioration of the oxygen sensor.

In FIG. 15, at time t11 at which the condition of executing the diagnosis processing is established, low element temperature control (low temperature control) of the element temperature of the first oxygen sensor is requested and the target impedance, not illustrated, is set to be large (for example, 2000Ω). Thereby, the heater is controlled such that the element temperature of the solid electrolyte becomes 400° C.

Next, at and after time t12 at which the element temperature of the solid electrolyte is stabilized at low temperature (the element impedance falls in the predetermined range (1800Ω<imp≦2200Ω)), the output of the voltage of the normal oxygen sensor is varied by a large amount since the reactivity by rich gas (CO) is increased. In contrast thereto, the variation amount of the output of the deteriorated oxygen sensor is small since the reactivity is reduced. The change speed is calculated by calculating the output variation amount of the oxygen sensor at that time at every predetermined timing. The change speed calculated in this way is summed up until reaching time t13 and the integrated value of the change speed sd1oxs1 at low temperature control is calculated.

Successively, when time t13 is reached, at this time, the high element temperature control (high temperature control) of the element temperature of the first oxygen sensor is requested and the target impedance is set to be small (for example, 25Ω). Thereby, the heater is controlled such that the element temperature of the solid electrolyte becomes 700° C.

At and after time t14 at which the solid electrolyte element is stabilized at high temperature (the element impedance falls in the predetermined range (15Ω<imp≦25Ω)), the variation amount of the output voltage of the normal oxygen sensor is reduced since the reactivity by rich gas (CO) is reduced in comparison with that at low temperature control. Further, the variation amount of the deteriorated sensor is similarly reduced.

During a time period until reaching time t15, the change speed integrated value sd1oxsh in high temperature control is calculated similar to that in low temperature control.

Further, at a time point of time t15, the change speed integrated value deviation amount de1xh1 which is the deviation between the change speed integrated value sd1oxs1 at low temperature control time and the change speed integrated value sd1oxsh at high temperature control time is calculated. The deviation amount de1xh1 becomes a large value when the oxygen sensor is normal and becomes a small value when the oxygen sensor is deteriorated. Therefore, presence or absence of the deterioration can be determined by comparing with a predetermined determinant. Further, although according to the embodiment, it is determined whether the oxygen sensor is deteriorated or normal, a degree of the deterioration can also be detected by providing a plurality of determinants. Naturally, the deviation amount de1xh1 can also be used as an index of the degree of deterioration as it is.

Further, although according to the embodiment, deterioration detection of the first oxygen sensor 25 is described, the embodiment is not limited thereto but can also be used for deterioration detection of the second oxygen sensor 26. Further, the embodiment can also be used for the linear air-fuel ratio sensor 24.

Figure 16:
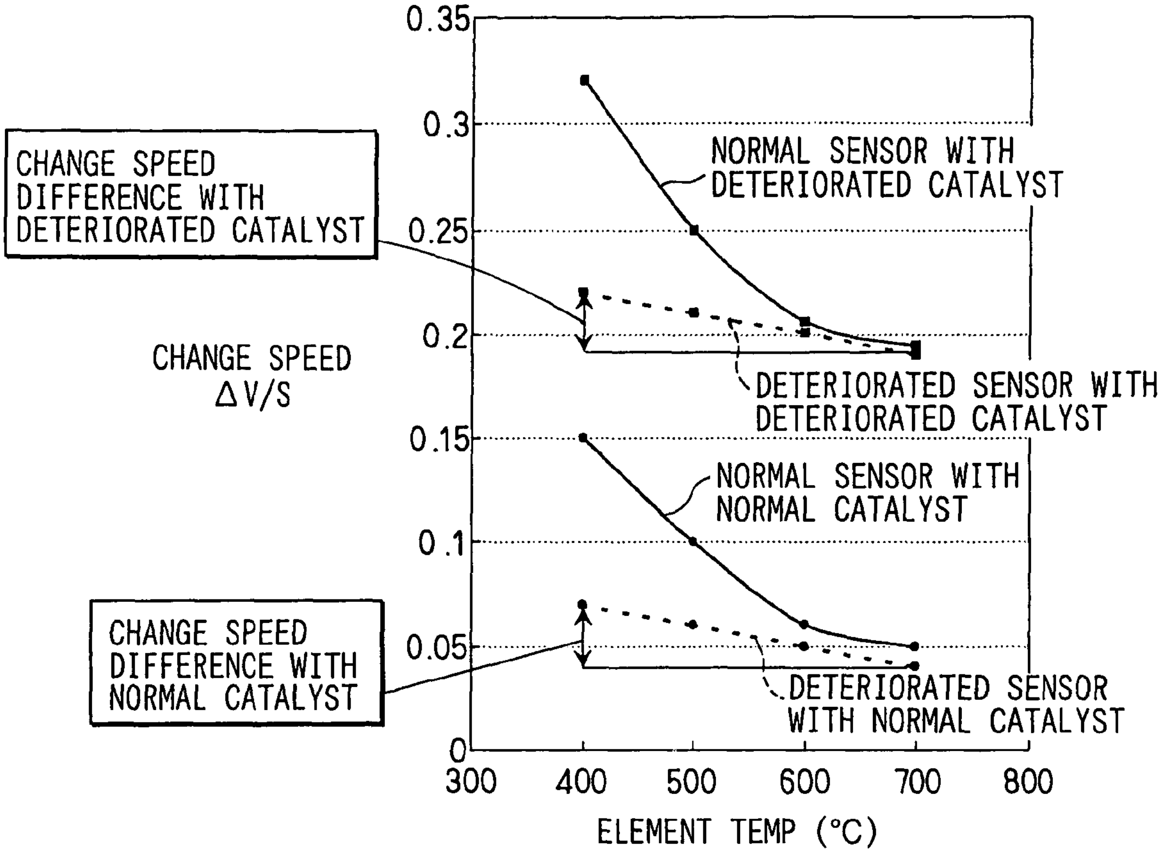
FIG. 16 is a characteristic diagram showing principle of detecting the deterioration of the oxygen sensor.
Figure 17:
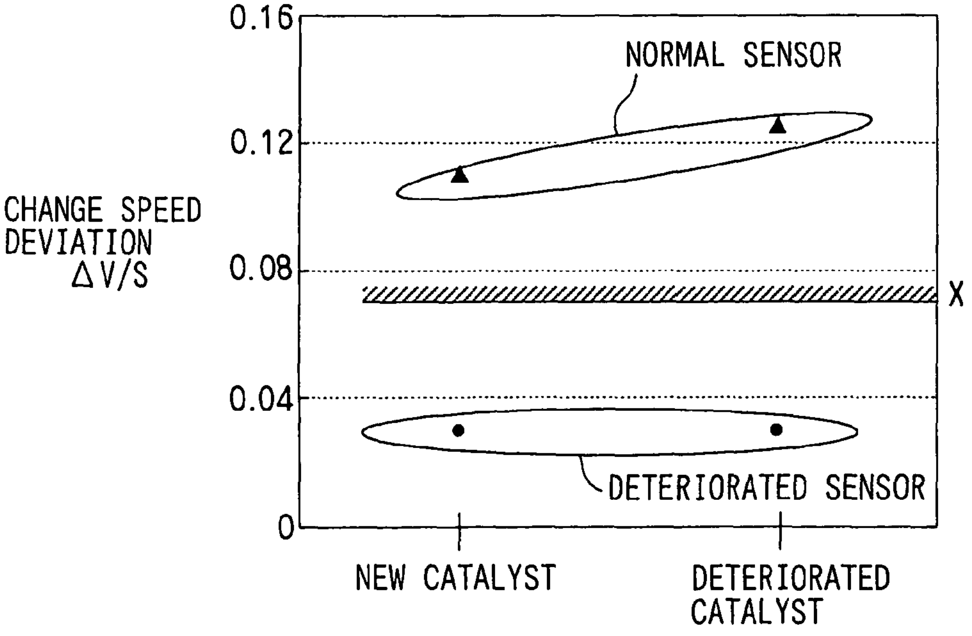
FIG. 17 is a characteristic diagram showing an allowance of detecting the deterioration of the oxygen sensor.

The diagnosis processing according to the embodiment is less influenced by the catalyst storage function as described in reference to FIG. 16 and FIG. 17.

As shown in FIG. 16, the lower the element temperature change speed, the larger the change speed of the oxygen sensor since the lower the element temperature, the more increased is the sensitivity of the rich gas (CO) component. Therefore, a degree of deterioration of the oxygen sensor can be detected by the deviation between the change speeds when the element temperature is high (for example, 700° C.) and when the element temperature is low (for example, 400° C.).

Further, in a state in which the catalyst is deteriorated and particularly the $O_2$ storage function is reduced, the change speed of the oxygen sensor output is increased as shown by FIG. 16 in comparison with that when the catalyst is normal. However, according to the method, the deviation between the change speeds when the element is controlled to high temperature and when the element is controlled to low temperature is calculated, and the deterioration of the oxygen sensor is determined based on this calculated deviation. Therefore, a change amount by the catalyst storage is canceled, and hence the influence is minimized.

FIG. 17 shows the deviation of the oxygen sensor change speed in accordance with the degree of deteriorating the catalyst. In this way, according to the invention, the influence of the catalyst storage function is less effected. Therefore, the normal oxygen sensor and the deteriorated oxygen sensor can be differentiated from each other without depending on the cleaning function or the degree of deterioration of the catalyst.

Second Embodiment

In the first embodiment, detecting abnormality of the oxygen sensor is made by comparing the variations of the sensor outputs when the element temperature of the oxygen sensor is controlled to high temperature and when the element temperature is control to low temperature under a certain specific operating condition. According to the second embodiment, detection performance is further promoted as described below.

Figure 18:
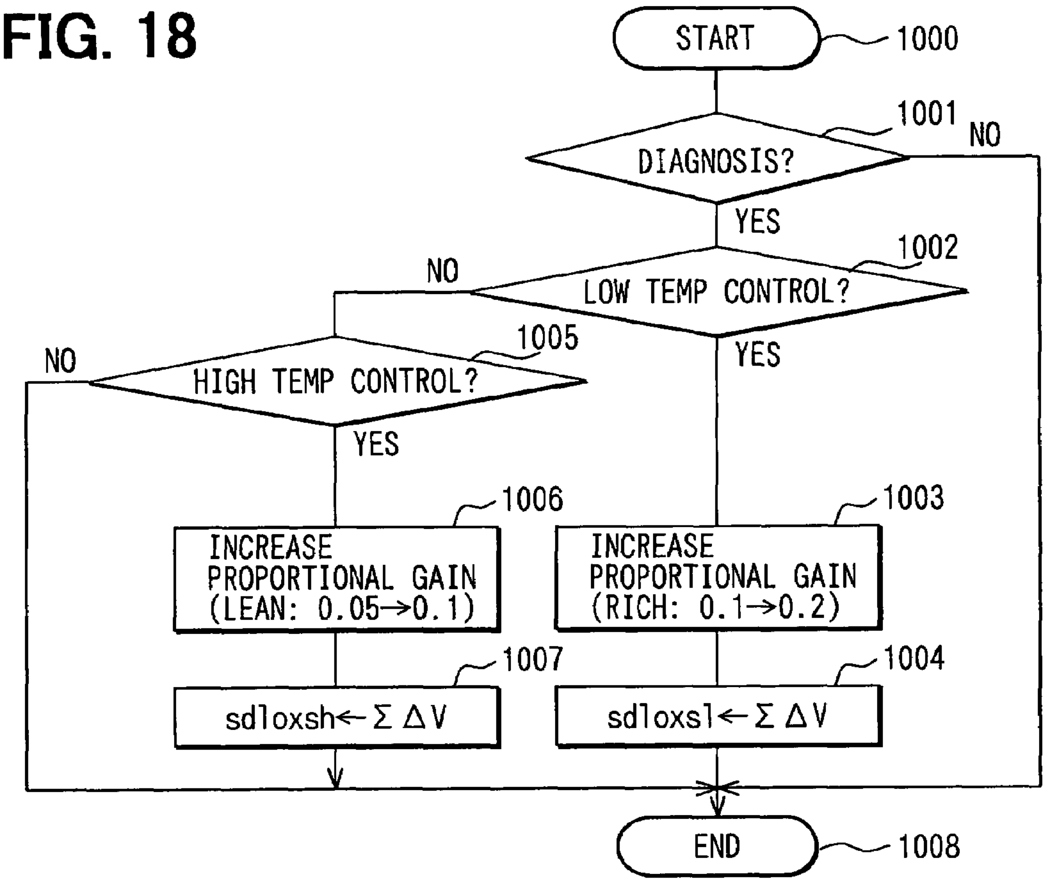
FIG. 18 is a flowchart executed by ECU of a second embodiment of the present invention.

In FIG. 18, first, at a predetermined timing, step 1000 is started. Next, at step 1001, the condition of executing diagnosis is determined, that is, whether the rotational speed or the air amount of the engine is under the predetermined operating condition and/or whether the catalyst temperature is equal to or higher than the predetermined temperature. Further, it is determined also as the condition of executing diagnosis whether the sensor element temperature is stabilized by an elapse time period after executing the temperature control of the sensor element, not illustrated, or an estimated value of the sensor element temperature (including element impedance).

At step 1001, when it is determined that the condition of executing diagnosis is not established, the processing proceeds to step 1008 and finishes the program. When it is determined that the condition of executing diagnosis is established at step 1001, the processing proceeds to 1002.

At step 1002, it is determined whether the low element temperature control is to be executed. When it is determined that the low element temperature control is to be executed here, the processing proceeds to step 1003 in order to further promote detection performance of diagnosis, makes a proportional control gain (rich side proportional gain) of sub-feedback control by the first oxygen sensor 25 larger than that in normal control to thereby provide larger gas change. According to the embodiment, the gain is increased from 0.1 at normal time to 0.2.

At sensor low element temperature control time, the reactivity with rich gas (CO) of the oxygen sensor is promoted. Therefore, by increasing the control gain in this way, larger correction can be achieved. Therefore, when the sensor detects rich (large output), by carrying out large reducing correction, lean gas can be supplied at once and the oxygen sensor reacts with rich or lean significantly. Further, the processing proceeds to step 1004 and the variation of the sensor output is summed up.

Further, when it is determined at step 1002 that the low element temperature control is not executed, the processing proceeds to step 1005. At step 1005, it is determined whether high element temperature control is to be executed. In the case of the high element temperature control, the processing proceeds to 1006 and makes a proportional control gain (lean side proportional gain) of the sub-feedback control larger than that at normal time similar to step 1003. According to the embodiment, the gain is increased from 0.05 at normal time to 0.1. Further, at step 1007, the variation of the sensor output is summed up.

According to the embodiment, in accordance with the sensor high element temperature control, the proportional gain on the rich side or the lean side is significantly changed to more remarkably extract respective gas reaction characteristics. However, it is not necessarily needed to change the respective gains in order to promote detection performance. However, in executing diagnosis, the proportional gain of the sub-feedback control may be increased without depending on the temperature control. Further, the proportional gain of the sub-feedback control may be changed such that only the reactivity on the rich side or the reactivity on the lean side is utilized.

Figure 19:
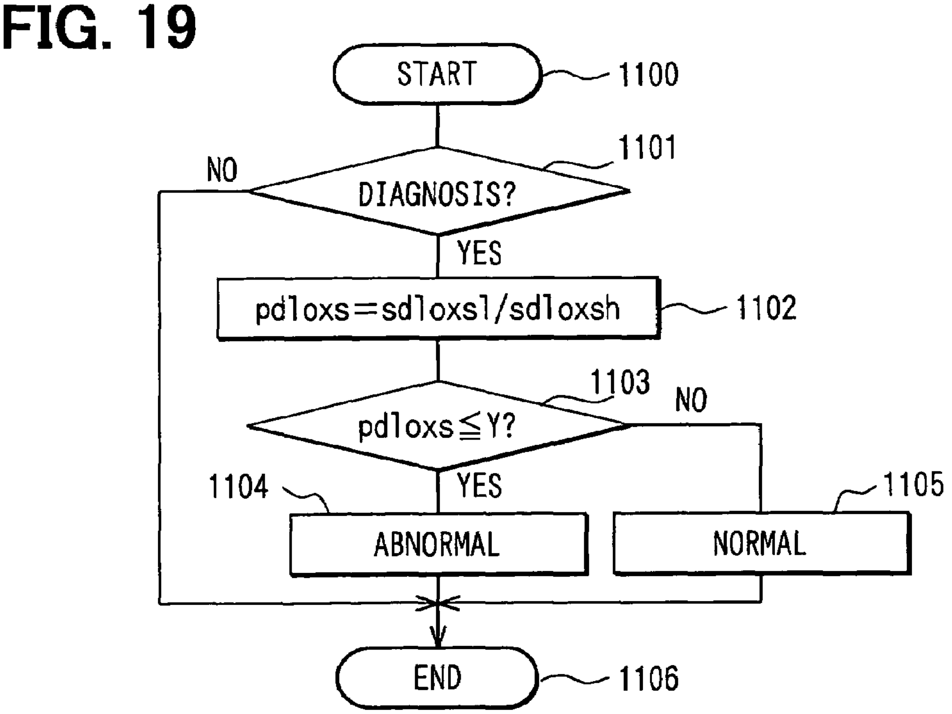
FIG. 19 is a flowchart showing processing of detecting a deterioration of an oxygen sensor according to the second embodiment.

Next, abnormality determination of the first oxygen sensor 25 will be explained in reference to FIG. 19. This determination may be applied to the second oxygen sensor 26 as well.

First, when step 1100 is started at a predetermined timing, at successive step 1101, a determination of whether normal/abnormal of the first oxygen sensor 25 may be determined is executed. This is determined based on whether the sensor output variation integration shown in FIG. 18 is executed for the predetermined time period and when respectives of the sensor high element temperature control and the low element temperature control are executed.

When it is determined that the condition of determining diagnosis is established, the processing proceeds to step 1102. At step 1102, there is calculated a ratio pd1oxs (=sd1oxs1/sd1oxsh) of the sensor output variation integration (sd1oxsh) at high element temperature control time relative to the sensor output valuation integration (sd1oxs1) at sensor low element temperature control time. Thereby, the deterioration of the sensor can stably be determined by excluding aging change of catalyst deterioration or the like.

Next, the processing proceeds to step 1103 and determines whether the sensor output variation integration ratio pd1oxs is equal to or smaller than a predetermined value. Here, when the ratio is equal to or smaller than the predetermined value, it is determined that the reactivities of the sensor electrode when the sensor element is at low temperature and at high temperature are deteriorated and the processing proceeds to 1104. Further, at step 1104, a first oxygen sensor abnormality flag is set. Meanwhile, when it is determined that the sensor output variation integration ratio pd1oxs is larger than the predetermined value at step 1103, the processing proceeds to step 1105. Further, a first oxygen sensor normality flag is set.

In FIG. 18, the proportional gain of the sub-feedback control is changed at the stoichiometric value (0.45V) of the oxygen sensor or higher or the value or lower. However, according to a modification shown in FIG. 20, the proportional gain is changed at a value slightly richer than the stoichiometric value (0.55V) or higher or a value slightly leaner than the stoichiometric value (0.35V) or lower. Thereby, the normality determination in the case of reacting with richer or leaner than normal can easily be executed and abnormality can be prevented from being determined erroneously.

Figure 20:
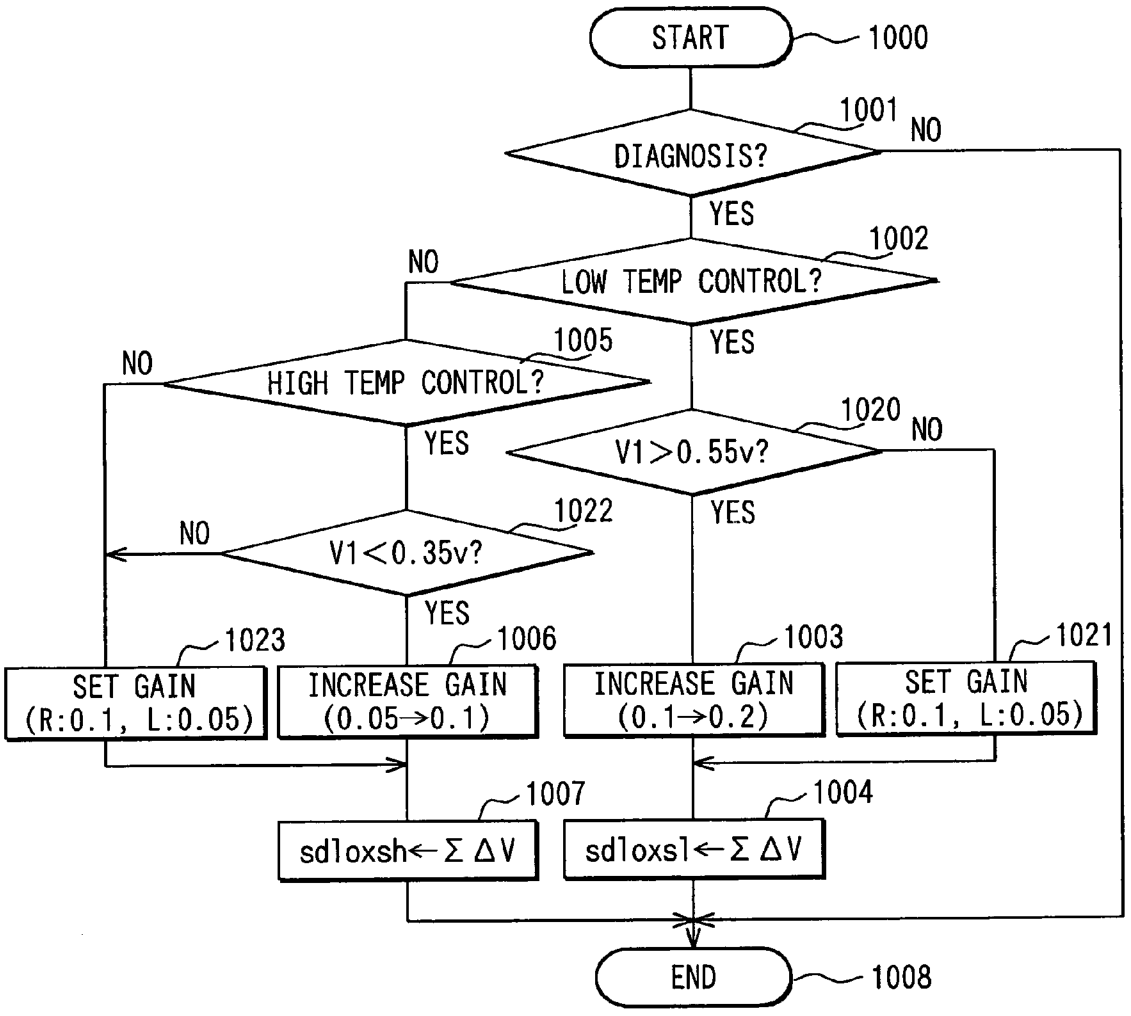
FIG. 20 is a flowchart executed by ECU of a modification of the second embodiment.

According to this modification, when it is determined at step 1002 in FIG. 20 that the low element temperature control is being executed, the processing proceeds to step 1020 and determines whether the first oxygen sensor output V1 is larger than 0.55V. When it is determined that the output is larger than 0.55V, the processing proceeds to step 1003 and carries out a processing similar to that of FIG. 18. Meanwhile, when it is determined at step 1020 that the first oxygen sensor output is equal to or smaller than 0.55V, the processing proceeds to step 1021, sets the rich proportional gain to 0.1 and the lean proportional gain to 0.05 and proceeds to step 1004.

Also when it is determined that the high element temperature control is being executed at step 1005, similarly, at successive step 1022, at this time, it is determined whether the first oxygen sensor output V1 is less than 0.35V. When it is determined here that the output is less than 0.35V, the processing proceeds to step 1006 and executes a processing similar to that in FIG. 18. Meanwhile, when the first oxygen sensor output V1 is equal to or larger than 0.35V, the processing proceeds to step 1023 and sets the rich proportional gain to 0.1 and the lean proportional gain to 0.05.

Next, operation of the second embodiment will be explained in reference to time charts of FIG. 21.

Figure 21:
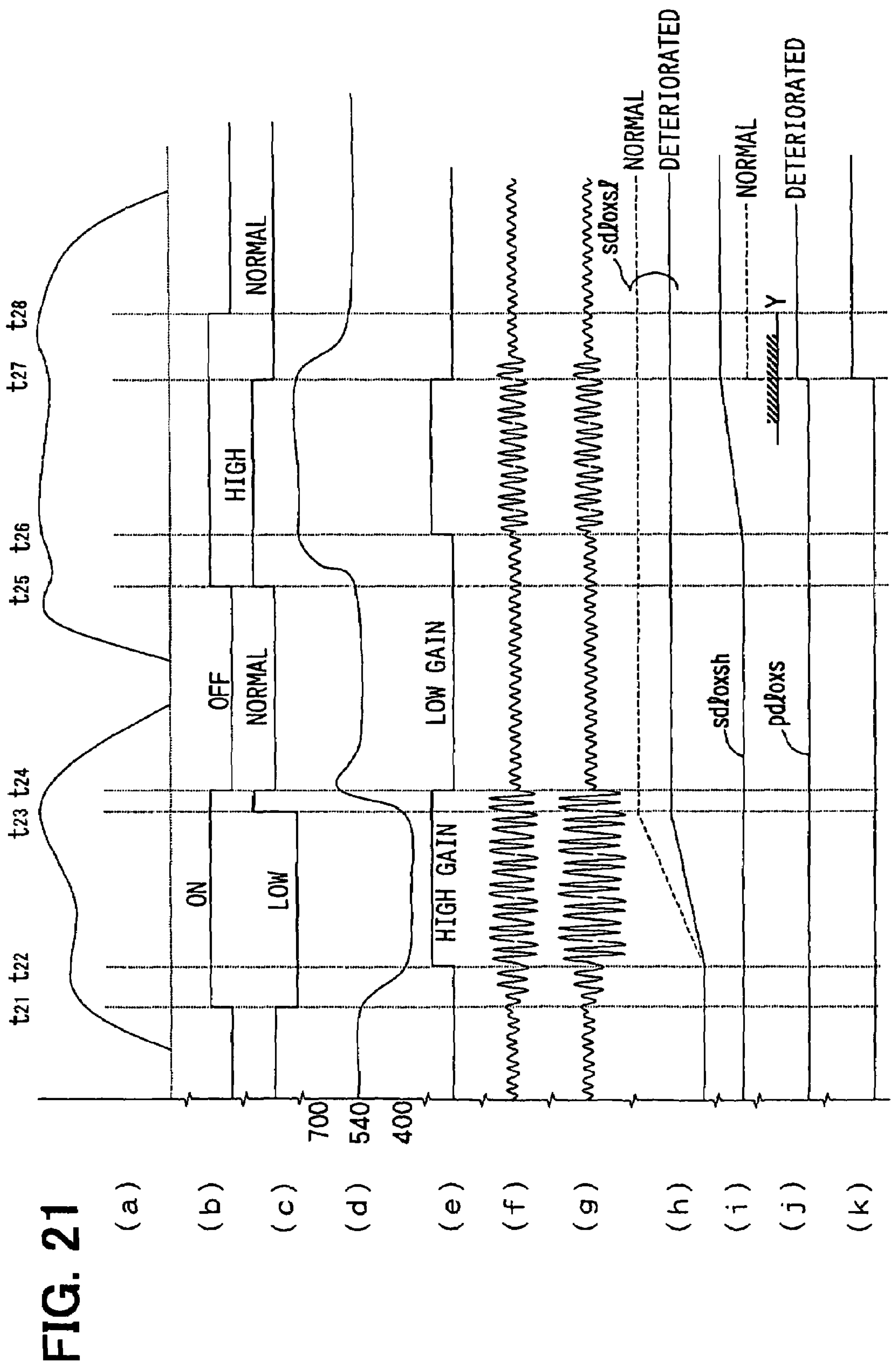
FIG. 21 is a time chart showing operation of the second embodiment.

In FIG. 21, (a) shows a vehicle speed. (b) shows diagnosis executing condition. (c) shows a request of the element temperature control, and (d) shows the element temperature. Further, (e) shows a request of the proportional gain of the sub-feedback. (f) shows the first oxygen sensor output V1 when deteriorated and (g) shows the first oxygen sensor output V1 at normal time. Further, (h) shows the output integrated value sd1oxs1 at low element temperature control time, (i) shows the output integrated value sd1oxsh at high element temperature control time and (j) shows the output integration ratio pd1oxs. Further, (k) shows the abnormality detection flag.

In FIG. 21, at time t21 at which running is shifted from acceleration to steady-state running, the diagnosis executing condition is established and the diagnosis execution allowance flag is made ON. At this time, the sensor low element temperature control is requested and the sensor element temperature of the first oxygen sensor is made to be low by setting the target impedance, not illustrated, to be large. As a result, the element temperature is lowered to 400° C.

Next, at time t22 at which the element temperature is stabilized, the proportional gain of the sub-feedback control is set to be large. Therefore, a request for the sub-feedback gain requests high gain. At this time, the output of the oxygen sensor is increased since the oxygen sensor is reacted by rich gas (CO). Since the proportional gain is large, correction to the lean side (reducing correction of injection amount) is significantly promoted and the oxygen sensor output is operated significantly to the lean side.

Here, when the electrode of the oxygen sensor is deteriorated, the reactivity is reduced. Therefore, the illustrated output of the oxygen sensor when deteriorated is brought about. However, when the oxygen sensor is normal, the output is further significantly varied as in the illustrated output of the oxygen sensor at normal time. The variation of the output of the oxygen sensor at this time is summed up and the low temperature time output integrated value is calculated. In this way, the output of the oxygen sensor when the element is at low temperature is finished to be integrated during a predetermined time period between time t22 to t23 and the sensor high element temperature control is successively executed.

However, at time t24, the diagnosis executing condition is not established. Therefore, the sensor high element temperature control is returned to the normal temperature control. Thereafter, when the diagnosis executing condition is established again at time t25, the high element temperature control is started. At time t26 at which the sensor element temperature is stabilized to be high, a request for increasing the sub-feedback gain is issued and the proportional gain is set to be large.

Further, during a predetermined time period from time t26 to t27, the integrated value of the oxygen sensor output variation at the sensor element high temperature time is calculated. At time t27, the integrated values of the output variations of the oxygen sensor when the sensor element is at low temperature and when the sensor element is at high temperature have respectively been calculated. Therefore, the ratio of the integrated values of the output variation of the oxygen sensor when the sensor element is at low temperature and when the sensor is at high temperature is calculated.

When the sensor electrode is normal, the output variation integrated value ratio becomes larger than a predetermined value, however, when the electrode is deteriorated, the output variation integrated value ratio becomes small. By comparing the output variation integrated value ratio with a previously stored determinant in this way, the deterioration of the sensor electrode can be detected.

Although according to the above method, the diagnosis detection is carried out by utilizing the sub-feedback control for correcting the feedback control of the air-fuel ratio by the air-fuel ratio sensor before the catalyst (hereinafter, described as main feedback control), a method of utilizing the main feedback control will be explained in reference to FIG. 22 as a modification.

Figure 22:
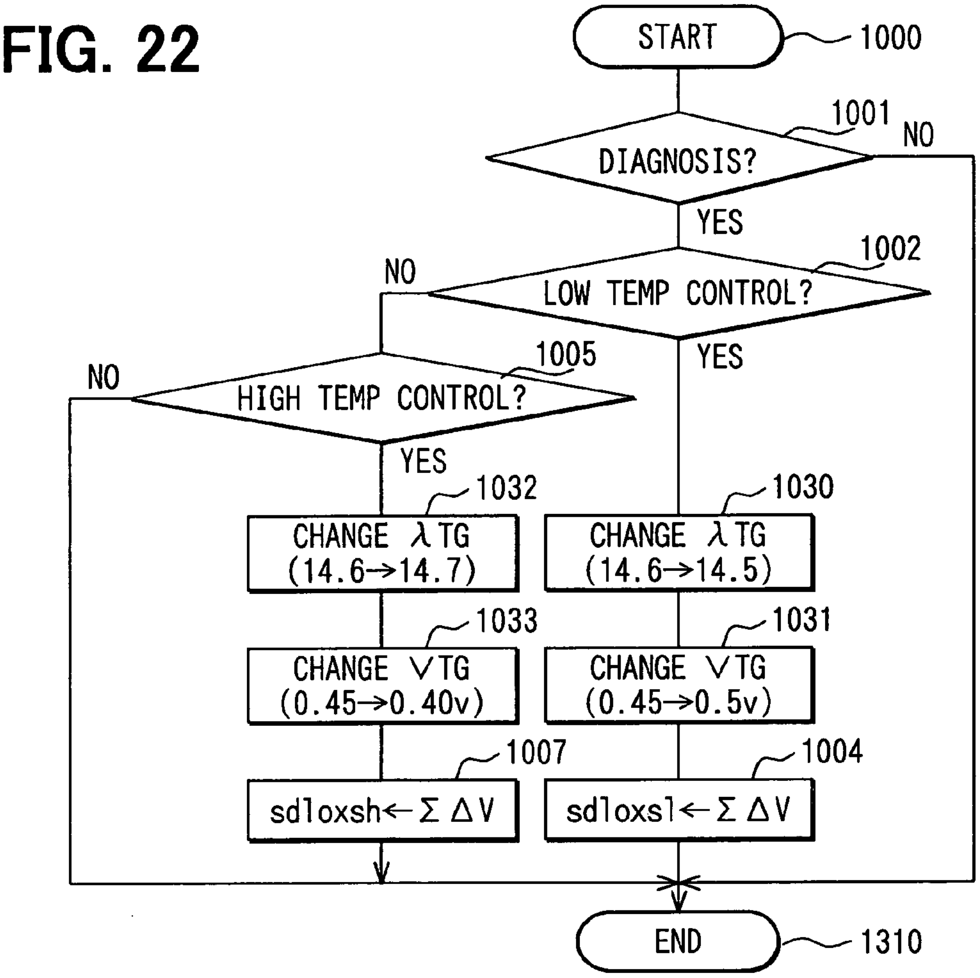
FIG. 22 is a flowchart executed by ECU of a modification of the second embodiment.

In FIG. 22, the determination of the sensor element temperature control at step 1002 and step 1005 are similar to those shown in FIG. 18. However, instead of increasing the proportional gain of the sub-feedback control, the target air-fuel ratio λTG of the main feedback control is changed. That is, at steps 1030 and 1031, the target air-fuel ratio of the main feedback control is set to be slightly rich (14.5) and at steps 1032 and 1033, the target air-fuel ratio of the main feedback control is conversely set to be slightly lean (14.7).

When the sensor element temperature is controlled to be low in this way, the reactivity is promoted by rich gas (CO). Therefore, an effect is achieved by controlling emission gas on the rich side. In contrast thereto, when the sensor element temperature is controlled to be high, the effect is promoted by controlling emission gas in the lean side.

Here, the air-fuel ratio (oxygen sensor output VTG) downstream from the catalyst is set to be slightly rich at step 1031. Further, the air-fuel ratio downstream from the catalyst is set to be slightly lean at step 1033. The diagnosis is executed by detecting the variation of the oxygen sensor by the sub-feedback control.

However, a similar effect can be achieved even when the sub-feedback control is stopped and a variation of the air-fuel ratio by a small amount is provided to the main feedback control at every predetermined time period.

Figure 23:
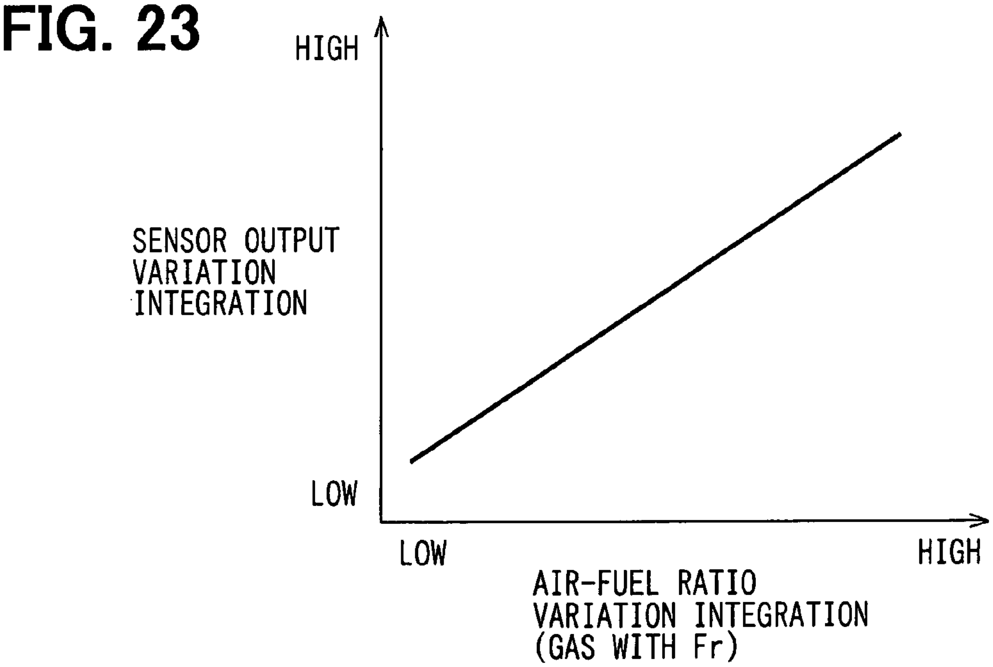
FIG. 23 is a correlation diagram showing a relationship between a variation in an air-fuel ratio before a catalyst and a summed value of a variation in a sensor output.

As shown by FIG. 23, integration of the sensor output variation is significantly influenced by the variation of the air-fuel ratio upstream from the catalyst. Although has described above, when the diagnosis is executed only in the stabilized operating state, the influence of the variation of the air-fuel ratio upstream from the catalyst is not effected, in order to increase the detection frequency, the influence needs to be excluded.

Figure 24:
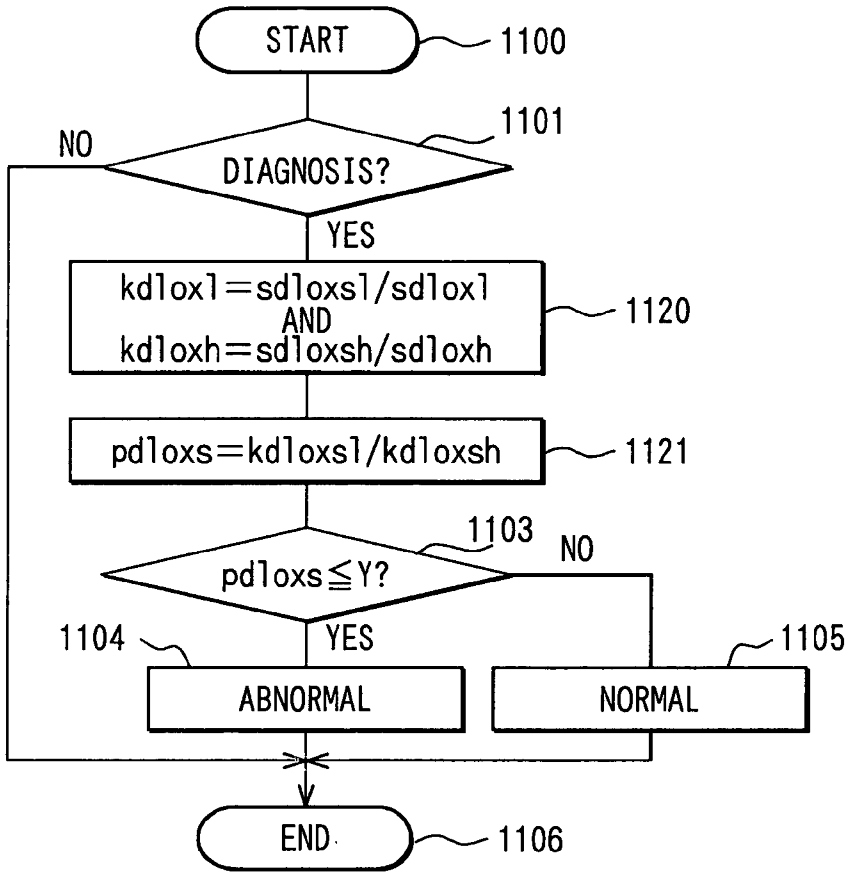
FIG. 24 is a flowchart executed by ECU of a modification of the second embodiment.

The embodiment will be explained in reference to FIG. 24. If it is determined at step 1101 that the diagnosis determining condition is established, at step 1120, ratios kdloxl and kdloxh of integration of the variation of the air-fuel ratio upstream the catalyst to integration of a variation of the air-fuel ratio downstream the catalyst (oxygen sensor output variation) is calculated respectively when the sensor element is controlled at low temperature and when the sensor element is controlled at high temperature. Thereby, the influence of the variation of the air-fuel ratio upstream the catalyst is excluded.

At successive step 1121, a ratio pd1oxs (=kd1oxs1/kd1oxsh) is calculated. kdloxl is a ratio of the integrated values sdloxsl of the variation of the air-fuel ratio upstream the catalyst to an integrated value sdloxl of the variation of the air-fuel ratio downstream the catalyst which are calculated at step 1120 when the sensor element has low temperature. kd1oxsh is a ratio of the integrated value sdloxsh of the variation of the air-fuel ratio upstream the catalyst to the integrated value sd1oxh of the variation of the air-fuel ratio downstream the catalyst when the sensor element is at high temperature. Next, the processing proceeds to step 1103, and determines whether the first oxygen sensor is normal or abnormal as has been explained in reference to FIG. 19.

Figure 25:
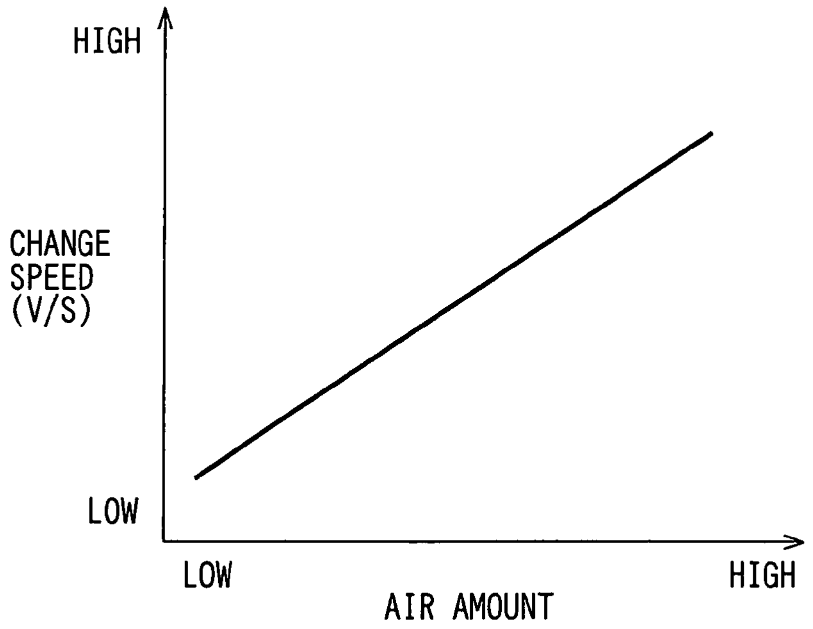
FIG. 25 is a correlation diagram showing a relationship between an intake air amount and a sensor output variation.

Although according to the invention, diagnosis is executed by using the integrated value of the output variation of the oxygen sensor, the diagnosis can also be executed by change speed (ΔV) per time, amplitude, or a frequency of the oxygen sensor. However, as shown by FIG. 25, there is a characteristic in which when an air amount is increased, a reaction rate of the oxygen sensor is increased. Therefore, the change speed needs to be corrected in accordance with the air amount.

What is claimed is:

1. An apparatus for detecting a deterioration of an air-fuel ratio sensor, the deterioration detecting apparatus comprising:

air-fuel ratio sensor having an electrode on a solid electrolyte element for detecting an air-fuel ratio in an exhaust emission gas from an engine;

temperature adjusting means for adjusting a temperature of the solid electrolyte element in the air-fuel ratio sensor to at least two different predetermined temperatures, which cause a change in an output of the air-fuel ratio sensor to be larger in a normal state than in a deteriorated state; and air-fuel ratio detection deterioration detecting means for detecting a deterioration of the air-fuel ratio sensor based on the outputs of the air-fuel ratio sensor produced when the temperature of the solid electrolyte element is adjusted to the two different temperatures by the temperature adjusting means.

2. The apparatus for detecting a deterioration of an air-fuel ratio sensor according to claim 1, wherein the temperature adjusting means adjusts the temperature and the air-fuel ratio detection deterioration detecting means detects the deterioration when the engine is in a predetermined same operating condition.

3. The apparatus for detecting a deterioration of an air-fuel ratio sensor according to claim 1, wherein the air-fuel ratio detection deterioration detecting means detects the deterioration of the air-fuel ratio sensor by comparing the outputs of the air-fuel ratio sensor relative to predetermined variations of the air-fuel ratio.

4. The apparatus for detecting a deterioration of an air-fuel ratio sensor according to claim 1, wherein the air-fuel ratio detection deterioration detecting means detects the deterioration of the air-fuel ratio sensor by comparing a response of the air-fuel ratio sensor relative to predetermined variations of the air-fuel ratio or a parameter related to an output characteristic with respect to the exhaust emission gas.

5. The apparatus for detecting a deterioration of an air-fuel ratio sensor according to claim 4, wherein the response or the parameter related to the output characteristic with respect to the exhaust emission gas is at least one of an output variation width, an output integrated value, an output differential value, an integrated value of the output differential value, an output period and an output frequency of the air-fuel ratio sensor.

6. The apparatus for detecting a deterioration of an air-fuel ratio sensor according to claim 1, wherein the temperature adjusting means estimates the temperature of the solid electrolyte element by detecting an internal resistance of the air-fuel ratio sensor and adjusts the temperature of the solid electrolyte element based on the estimated temperature.

7. The apparatus for detecting a deterioration of an air-fuel ratio sensor according to claim 6, wherein the temperature adjusting means determines an amount of heat for adjusting the temperature of the solid electrolyte element in accordance with an operating condition.

8. The apparatus for detecting a deterioration of an air-fuel ratio sensor according to claim 1, wherein the temperature adjusting means supplies or stops the heat for adjusting the temperature of the solid electrolyte element under a predetermined operating condition.

9. The apparatus for detecting a deterioration of an air-fuel ratio sensor according to claim 1, wherein the air-fuel ratio sensor is installed downstream from a catalyst.

10. The apparatus for detecting a deterioration of an air-fuel ratio sensor according to claim 1, further comprising:

temperature adjusting failure detecting means for detecting a failure of the temperature adjusting means, wherein the air-fuel ratio detection deterioration detecting means detects the deterioration of the air-fuel ratio sensor only when the failure is not detected by the temperature adjusting failure detecting means.

11. An apparatus for detecting a deterioration of an air-fuel ratio sensor, the deterioration detecting apparatus comprising:

air-fuel ratio sensor having an electrode on a solid electrolyte element for detecting an air-fuel ratio in an exhaust emission gas from an engine;

temperature adjusting means for adjusting a temperature of the solid electrolyte element in the air-fuel ratio sensor from a present temperature to at least two different predetermined temperatures, which are set for detecting deterioration of the air-fuel ratio sensor; and air-fuel ratio detection deterioration detecting means for detecting the deterioration of the air-fuel ratio sensor based on outputs of the air-fuel ratio sensor produced when the temperature of the solid electrolyte element is adjusted to the two different temperatures by the temperature adjusting means.

12. The apparatus for detecting a deterioration of an air-fuel ratio sensor according to claim 11, wherein the temperature adjusting means estimates the temperature of the solid electrolyte element by detecting an internal resistance of the air-fuel ratio sensor and adjusts the temperature of the solid electrolyte element based on the estimated temperature.

13. The apparatus for detecting a deterioration of an air-fuel ratio sensor according to claim 11, wherein the air-fuel ratio sensor is installed downstream from a catalyst.

14. The apparatus for detecting a deterioration of an air-fuel ratio sensor according to claim 11, further comprising:

temperature adjusting failure detecting means for detecting a failure of the temperature adjusting means, wherein the air-fuel ratio detection deterioration detecting means detects the deterioration of the air-fuel ratio sensor only when the failure is not detected by the temperature adjusting failure detecting means.

15. An apparatus for detecting a deterioration of an air-fuel ratio sensor, the deterioration detecting apparatus comprising:

air-fuel ratio sensor having an electrode on a solid electrolyte element for detecting an air-fuel ratio in an exhaust emission gas from an engine;

temperature adjusting means for adjusting a temperature of the solid electrolyte element in the air-fuel ratio sensor to at least two different predetermined temperatures; and air-fuel ratio detection deterioration detecting means for detecting a deterioration of the air-fuel ratio sensor based on change speeds of outputs of the air-fuel ratio sensor produced when the temperature of the solid electrolyte element is adjusted to the two different temperatures by the temperature adjusting means.

16. The apparatus for detecting a deterioration of an air-fuel ratio sensor according to claim 15, wherein the temperature adjusting means estimates the temperature of the solid electrolyte element by detecting an internal resistance of the air-fuel ratio sensor and adjusts the temperature of the solid electrolyte element based on the estimated temperature.

17. The apparatus for detecting a deterioration of an air-fuel ratio sensor according to claim 15, wherein the air-fuel ratio sensor is installed downstream from a catalyst.

18. The apparatus for detecting a deterioration of an air-fuel ratio sensor according to claim 15, further comprising:

temperature adjusting failure detecting means for detecting a failure of the temperature adjusting means, wherein the air-fuel ratio detection deterioration detecting means detects the deterioration of the air-fuel ratio sensor only when the failure is not detected by the temperature adjusting failure detecting means.

19. A method of detecting a deterioration of an air-fuel ratio sensor having an electrode on a solid electrolyte element, the method comprising:

detecting an air-fuel ratio in an exhaust emission gas from an engine using the air fuel ratio sensor;

adjusting a temperature of the solid electrolyte element in the air-fuel ratio sensor to at least two different predetermined temperatures, which cause a change in an output of the air-fuel ratio sensor to be larger in a normal state than in a deteriorated state; and detecting a deterioration of the air-fuel ratio sensor based on the outputs of the air-fuel ratio sensor produced when the temperature of the solid electrolyte element is adjusted to the two different temperatures.

20. The method according to claim 19, wherein the temperature of the solid electrolyte element is estimated by detecting an internal resistance of the air-fuel ratio sensor and the temperature of the solid electrolyte element is adjusted based on the estimated temperature.

21. The method according to claim 19, further comprising:

detecting a failure of a mechanism which adjusts the temperature of the solid electrolyte element in the air-fuel ratio sensor, wherein the deterioration of the air-fuel ratio sensor is detected only when the failure of the mechanism which adjusts the temperature is not detected.

22. A method of detecting a deterioration of an air-fuel ratio sensor having an electrode on a solid electrolyte element, the method comprising:

detecting an air-fuel ratio in an exhaust emission gas from an engine using the air fuel ratio sensor;

adjusting a temperature of the solid electrolyte element in the air-fuel ratio sensor from a present temperature to at least two different predetermined temperatures, which are set for detecting deterioration of the air-fuel ratio sensor; and detecting the deterioration of the air-fuel ratio sensor based on outputs of the air-fuel ratio sensor produced when the temperature of the solid electrolyte element is adjusted to the two different temperatures.

23. The method according to claim 22, wherein the temperature of the solid electrolyte element is estimated by detecting an internal resistance of the air-fuel ratio sensor and the temperature of the solid electrolyte element is adjusted based on the estimated temperature.

24. The method according to claim 22, further comprising:

detecting a failure of a mechanism which adjusts the temperature of the solid electrolyte element in the air-fuel ratio sensor;

wherein the deterioration of the air-fuel ratio sensor is detected only when the failure of the mechanism which adjusts the temperature is not detected.

25. A method of detecting a deterioration of an air-fuel ratio sensor having an electrode on a solid electrolyte element, the method comprising:

detecting an air-fuel ratio in an exhaust emission gas from an engine using the air-fuel ratio sensor;

adjusting a temperature of the solid electrolyte element in the air-fuel ratio sensor to at least two different predetermined temperatures; and detecting a deterioration of the air-fuel ratio sensor based on change speeds of outputs of the air-fuel ratio sensor produced when the temperature of the solid electrolyte element is adjusted to the two different temperatures.

26. The method according to claim 25, wherein the temperature of the solid electrolyte element is estimated by detecting an internal resistance of the air-fuel ratio sensor and the temperature of the solid electrolyte element is adjusted based on the estimated temperature.

27. The method according to claim 25, further comprising:

detecting a failure of a mechanism which adjusts the temperature of the solid electrolyte element in the air-fuel ratio sensor;

wherein the deterioration of the air-fuel ratio sensor is detected only when failure of the mechanism which adjusts the temperature is not detected.

* * * * *